(12) United States Patent
Kwon et al.

(10) Patent No.: US 11,376,507 B2
(45) Date of Patent: Jul. 5, 2022

(54) APPARATUS FOR DATA PREPROCESSING FOR CLASSIFYING THE PSYCHOLOGY OF A GAME USER AND AN OPERATION THEREOF

(71) Applicant: Sentience Inc., Seoul (KR)

(72) Inventors: Hyemin Kwon, Busan (KR); Insu Gim, Seoul (KR); Myunsoo Kim, Goyang-si (KR); Hyeyon Kwon, Yongin-si (KR)

(73) Assignee: Sentience Inc., Seoul (KR)

( * ) Notice: Subject to any disclaimer, the term of this patent is extended or adjusted under 35 U.S.C. 154(b) by 84 days.

(21) Appl. No.: 17/023,627

(22) Filed: Sep. 17, 2020

(65) Prior Publication Data

US 2021/0086086 A1 Mar. 25, 2021

(30) Foreign Application Priority Data

Sep. 25, 2019 (KR) .................. 10-2019-0117907

(51) Int. Cl.
*A63F 13/79* (2014.01)
(52) U.S. Cl.
CPC .................. *A63F 13/79* (2014.09)
(58) Field of Classification Search
None
See application file for complete search history.

(56) References Cited

U.S. PATENT DOCUMENTS

| | | | | |
|---|---|---|---|---|
| 9,498,704 | B1* | 11/2016 | Cohen | A63F 9/183 |
| 2009/0149246 | A1* | 6/2009 | Opaluch | A63F 13/63 |
| | | | | 463/30 |
| 2017/0065892 | A1* | 3/2017 | Loeb | A63F 13/79 |
| 2018/0001209 | A1* | 1/2018 | Verfaillie | A63F 13/35 |
| 2019/0321730 | A1* | 10/2019 | Shetty | A63F 13/67 |
| 2020/0206631 | A1* | 7/2020 | Sumant | G06V 40/20 |

FOREIGN PATENT DOCUMENTS

| | | |
|---|---|---|
| JP | 5903729 B1 | 4/2016 |
| KR | 1020120077228 A | 7/2012 |
| KR | 1020150013378 A | 2/2015 |
| KR | 1020180058598 A | 6/2018 |

OTHER PUBLICATIONS

Office Action of Korean Application No. 10-2019-0117907 dated Dec. 24, 2020.
Office Action of Korean Application No. 10-2019-0117907 dated Jun. 28, 2021.

* cited by examiner

*Primary Examiner* — Jason T Yen
(74) *Attorney, Agent, or Firm* — Dinsmore & Shohl LLP; Yongsok Choi, Esq.

(57) ABSTRACT

Disclosed is an operating method of a server which analyzes a user's psychology to classify the user. The operating method includes receiving a raw database from a server of a game service provider, acquiring setup information of at least one module to acquire reference data corresponding to one of a plurality of models from the raw database, generating reference data from data of users included in the raw database on the basis of at least one module which is set on the basis of the setup information, and acquiring psychological state information of a user to be analyzed on the basis of the reference data.

9 Claims, 20 Drawing Sheets

APPARATUS FOR DATA PREPROCESSING FOR CLASSIFYING THE PSYCHOLOGY OF A GAME USER AND AN OPERATION THEREOF

CROSS-REFERENCE TO RELATED APPLICATION

This application claims priority to and the benefit of Korean Patent Application No. 10-2019-0117907, filed on Sep. 25, 2019, the disclosure of which is incorporated herein by reference in its entirety.

BACKGROUND

1. Field of the Invention

The present disclosure relates to a game content recommendation apparatus and an operating method therefor, and more particularly, to an apparatus and method for acquiring a reference for recommending game content according to users' tendencies.

2. Discussion of Related Art

Generally, games are widely used by the general public with various types of content and various details. Conventional games are used to provide various pastimes and amusements. In addition, games are provided to users while the users' tendencies for the games are classified as a hardcore gamer, casual gamer, and the like or while the difficulty is classified as Hard, Normal, Easy, etc. In addition, games are classified according to age, gender, game genre, and the like.

Users have various personalities or tendencies that are difficult to express with limited game characters, and it is not easy to provide a game service to users who enjoy conventional games to allow users to enjoy the games according to the users' tendencies.

Also, there have been cases where a game provider conducted a survey to learn users' tendencies, but it was not easy to understand the users' tendencies in a game due to the gap between the survey and the game.

Recently, along with the development of technology, an algorithm for providing a user with a user-specific advertisement in a game or for recommending content to a user based on artificial intelligence has been developed. However, in-game advertisements are not directly related to game progress, and thus there are cases where users feel fatigue. Also, an algorithm that recommends content to users based on artificial intelligence is machine-learned depending only on the purchase probability and thus cannot reflect the users' psychological states.

In addition, since games often form a structured story or event, users may feel repulsed or bored with the games when the game content does not fit the users' tendencies or psychological states.

Consequently, there is an increasing need for an apparatus and method for providing users with game content which fits the users' tendencies. Also, there is an increasing need for an apparatus and method for acquiring a reference for classifying users' tendencies.

SUMMARY OF THE INVENTION

According to an aspect of the present disclosure, there is provided an operating method of a server which analyzes a user's psychology to classify the user, the operating method including receiving a raw database from a server of a game service provider, acquiring setup information of at least one module to acquire reference data corresponding to one of a plurality of models from the raw database, generating reference data from data of users included in the raw database on the basis of at least one module which is set on the basis of the setup information, and acquiring psychological state information of a user to be analyzed on the basis of the reference data.

The acquiring of the setup information may include acquiring first period information from the setup information and acquiring a minimum number of times a Player Versus Player (PvP) mode is played from the setup information, and the generating of the reference data may include acquiring first log data, which corresponds to the first period information, of users who have used the PvP mode the minimum number of times the PvP mode is played or more from the raw database, acquiring a first distribution of users on a first axis, which represents a PvP content play ratio, on the basis of the first log data, acquiring a first reference value included in the reference data on the basis of the first distribution, acquiring a second distribution of users on a second axis, which represents a win rate in the PvP mode, on the basis of the first log data, and acquiring a second reference value included in the reference data on the basis of the second distribution.

The acquiring of the setup information may include acquiring second period information from the setup information, and the generating of the reference data may include acquiring second log data of users corresponding to the second period information from the raw database, acquiring a third distribution of users on a first axis, which represents the number of characters owned by a user, on the basis of the second log data, acquiring a third reference value included in the reference data on the basis of the third distribution, acquiring a fourth distribution of users on a second axis, which represents information related to a ratio of the amount of online money used for an item that changes the appearance of a character, on the basis of the second log data, and acquiring a fourth reference value included in the reference data on the basis of the fourth distribution.

The acquiring of the setup information may include acquiring third period information from the setup information and acquiring a list of relatively weak characters from the setup information, and the generating of the reference data may include acquiring third log data corresponding to the third period information from the raw database, acquiring a fifth distribution of users on a first axis, which represents the number of times a user uses a character included in the list of weak characters, on the basis of the third log data, and acquiring a fifth reference value included in the reference data on the basis of the fifth distribution.

The acquiring of the setup information may include acquiring fourth period information from the setup information, and the generating of the reference data may include acquiring fourth log data corresponding to the fourth period information from the raw database, acquiring a sixth distribution of users on a first axis, which represents a time in which a user uses first content, on the basis of the fourth log data, acquiring a sixth reference value included in the reference data on the basis of the sixth distribution, acquiring a seventh distribution of users on a second axis, which represents a time in which the user uses second content, on the basis of the fourth log data, and acquiring a seventh reference value included in the reference data on the basis of the seventh distribution.

The acquiring of the setup information may include acquiring fifth period information from the setup information, and the generating of the reference data may include acquiring fifth log data corresponding to the fifth period information from the raw database, acquiring an eighth distribution of users on a first axis, which represents the number of times a user has paid a billed amount, on the basis of the fifth log data, acquiring an eighth reference value included in the reference data on the basis of the eighth distribution, acquiring a ninth distribution of users on a second axis, which represents the number of times the user has failed while playing first content, on the basis of the fifth log data, and acquiring a ninth reference value included in the reference data on the basis of the ninth distribution.

The acquiring of the setup information may include acquiring sixth period information from the setup information, and the generating of the reference data may include acquiring sixth log data corresponding to the sixth period information from the raw database, acquiring a tenth distribution of users on a first axis, which represents efficiency information acquired on the basis of a total play time and character level information, on the basis of the sixth log data, acquiring a tenth reference value included in the reference data on the basis of the tenth distribution, acquiring an eleventh distribution of users on a second axis, which represents a billed amount for a user, on the basis of the sixth log data, and acquiring an eleventh reference value included in the reference data on the basis of the eleventh distribution.

The acquiring of the setup information may include acquiring seventh period information from the setup information, and the generating of the reference data may include acquiring seventh log data corresponding to the seventh period information from the raw database, acquiring a twelfth distribution of users on a first axis, which represents a ratio of using a character related to a first character among characters used by a user for a first sub-period included in the seventh period, on the basis of the seventh log data, acquiring a twelfth reference value included in the reference data on the basis of the twelfth distribution, acquiring a thirteenth distribution of users on a second axis, which represents a ratio of using a character related to the first character among the characters used by the user for a second sub-period included in the seventh period after the first sub-period, on the basis of the seventh log data, and acquiring a thirteenth reference value included in the reference data on the basis of the thirteenth distribution.

The acquiring of the setup information may include acquiring eighth period information from the setup information, and the generating of the reference data may include acquiring eighth log data corresponding to the eighth period information from the raw database, acquiring a fourteenth distribution of users on a first axis, which represents the number of types of characters used by a user, on the basis of the eighth log data, acquiring a fourteenth reference value included in the reference data on the basis of the fourteenth distribution, acquiring a fifteenth distribution of users on a second axis, which represents the number of types of character development items acquired by the user, on the basis of the eighth log data, and acquiring a fifteenth reference value included in the reference data on the basis of the fifteenth distribution.

The acquiring of the setup information may include acquiring ninth period information from the setup information, and the generating of the reference data may include acquiring ninth log data corresponding to the ninth period information from the raw database, acquiring a sixteenth distribution of users on a first axis, which represents variability in specific-time-slot play ratios during a third sub-period included in the ninth period, on the basis of the ninth log data, acquiring a sixteenth reference value included in the reference data on the basis of the sixteenth distribution, acquiring a seventeenth distribution of users on a second axis, which represents variability in specific-time-slot play ratios during a fourth sub-period included in the ninth period after the third sub-period, on the basis of the ninth log data, and acquiring a seventeenth reference value included in the reference data on the basis of the seventeenth distribution.

The acquiring of the setup information may include acquiring tenth period information from the setup information, and the generating of the reference data may include acquiring tenth log data corresponding to the tenth period information from the raw database, acquiring an eighteenth distribution of users on a first axis, which represents information related to a play time during a predetermined period of time, on the basis of the tenth log data, acquiring an eighteenth reference value included in the reference data on the basis of the eighteenth distribution, acquiring a nineteenth distribution of users on a second axis, which represents information related to a user's item usage during the predetermined period of time, on the basis of the tenth log data, and acquiring a nineteenth reference value included in the reference data on the basis of the nineteenth distribution.

The acquiring of the setup information may include acquiring sixteenth period information from the setup information, and the generating of the reference data may include acquiring fifteenth log data corresponding to the sixteenth period information from the raw database, acquiring a twenty-seventh distribution of users on a first axis, which represents information related to a play time during a predetermined period of time, on the basis of the fifteenth log data, acquiring a twenty-seventh reference value included in the reference data on the basis of the twenty-seventh distribution, acquiring a twenty-eighth distribution of users on a second axis, which represents information related to a period of time between a sign-up date and a date when an item that enhances character performance is changed, on the basis of the fifteenth log data, and acquiring a twenty-eighth reference value included in the reference data on the basis of the twenty-eighth distribution.

The acquiring of the setup information may include acquiring eleventh period information from the setup information, and the generating of the reference data may include acquiring eleventh log data corresponding to the eleventh period information from the raw database, acquiring a twentieth distribution of users on a first axis, which represents a period of time from a user's sign-up date to a time when first content is available, on the basis of the eleventh log data, acquiring a twentieth reference value included in the reference data on the basis of the twentieth distribution, acquiring a twenty-first distribution of users on a second axis, which represents a period of time from the user's sign-up date to a time when second content is available, on the basis of the eleventh log data, and acquiring a twenty-first reference value included in the reference data on the basis of the twenty-first distribution.

The acquiring of the setup information may include acquiring twelfth period information from the setup information and acquiring thirteenth period information from the setup information, and the generating of the reference data may include acquiring twelfth log data corresponding to the twelfth period information from the raw database, acquiring a twenty-second distribution of users on a first axis, which represents the number of items included in a predetermined item list among a plurality of items used by a user for a thirteenth period from a sign-up date of the user, on the basis of the twelfth log data, acquiring a twenty-second reference value included in the reference data on the basis of the twenty-second distribution, acquiring a twenty-third distribution of users on a second axis, which represents information related to a character level variation per unit time, on the basis of the twelfth log data, and acquiring a twenty-third reference value included in the reference data on the basis of the twenty-third distribution.

The acquiring of the setup information may include acquiring fourteenth period information from the setup information and acquiring fifteenth period information from the setup information, and the generating of the reference data may include acquiring fourteenth log data corresponding to the fourteenth period information from the raw database, deleting data of users who do not have access information after a fifteenth period from sign-up dates of the users from the fourteenth log data, acquiring a twenty-fourth distribution of users on a first axis, which represents information on a user's online-money turnover rate, on the basis of the fourteenth log data, acquiring a twenty-fourth reference value included in the reference data on the basis of the twenty-fourth distribution, acquiring a twenty-fifth distribution of users on a second axis, which represents the user's average daily play time, on the basis of the fourteenth log data, acquiring a twenty-fifth reference value included in the reference data on the basis of the twenty-fifth distribution, acquiring a twenty-sixth distribution of users on a third axis, which represents an experience point value acquired by the user per play time, on the basis of the fourteenth log data, and acquiring a twenty-sixth reference value included in the reference data on the basis of the twenty-sixth distribution.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
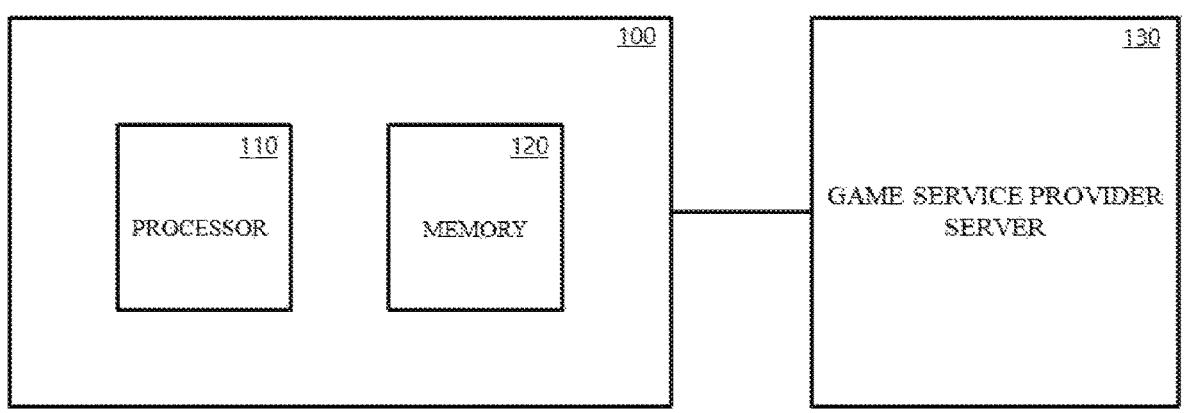
FIG. 1 is a diagram showing a server for recommending game content according to an embodiment of the present disclosure.

Advantages and features of the disclosed embodiments, and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art.

Terms used herein will be briefly described, and then exemplary embodiments will be described in detail below.

The terms used herein have been selected as general terms which are widely used at present in consideration of the functions of the present disclosure but may be altered according to the intent of an operator skilled in the art, conventional practice, or introduction of new technology. In addition, specific terms have been arbitrarily selected by the applicant and their meanings will be explained in detail in the corresponding description of the present disclosure. Therefore, the terms used herein should be defined on the basis of the overall content of the present disclosure instead of simply the names of the terms.

As used herein, the singular forms "a," "an," and "the" include the plural forms unless context clearly indicates otherwise. Also, the plural forms include the singular forms unless context clearly indicates otherwise.

Furthermore, when one part is referred to as "comprising" (or "including" or "having") other elements, it should be understood that the part can comprise (or include or have) only those elements or other elements as well as those elements unless specifically described otherwise.

As used herein, "information related to" any element refers to information calculated based on the element, an index corresponding to the element, information including the element, information having a linear relationship with the element, or information in which the element is included. The linear relationship may refer to a positive or inverse proportional relationship. The information may be numerical values or text.

The term "unit" used herein denotes a software or hardware element, and the "unit" performs any role. However, a "unit" is not limited to software or hardware. A "unit" may be configured to be in an addressable storage medium or to execute one or more processors. Accordingly, as an example, a "unit" includes elements such as software elements, object-oriented software elements, class elements, and task elements, processes, functions, attributes, procedures, subroutines, segments of program codes, drivers, firmware, micro-codes, circuits, data, a database, data structures, tables, arrays, and variables. Furthermore, functions provided in elements and "units" may be combined as a smaller number of elements and "units" or further divided into additional elements and "units."

According to an embodiment of the present disclosure, a "unit" may be implemented with a processor and a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

Hereinafter, exemplary embodiments will be fully described with reference to the accompanying drawings in such a way that those skilled in the art can easily carry out the embodiments. Further, in order to clearly illustrate the present disclosure, parts not related to the description are omitted in the drawings.

FIG. 1 is a diagram showing a server for recommending game content according to an embodiment of the present disclosure.

A server 100 may include a processor 110 or a memory 120. The processor 110 may perform an operation on the basis of instructions stored in the memory 120. However, the present disclosure is not limited thereto, and the server 100 may include no memory but may include only the processor 110. The processor 110 may be set to output a preset signal through an output line for a preset period on the basis of an input signal. Each component of the server 100 may perform a preset operation according to a signal.

A game service provider server 130 may include a raw database. In the raw database, raw data may be stored. The server 100 may receive the raw data from the game service provider server 130, process the received raw data, and transmit a result of the processing back to the game service provider server 130. For example, the server 100 may apply a predetermined criterion to a user's raw data to determine which tendency of a plurality of tendencies the user has. Also, the server 100 may select at least one of a plurality of predetermined models on the basis of the user's log data. The server 100 may recommend content or an item to the user on the basis of the user's tendency or the selected model. Thus, a game service provider may provide a user with content and an item based on behavioral economics.

The game service provider server 130 may store a very large amount of log data in the raw database in a short time in real time. The log data stored in the raw database is data associated with a user's (a gamer's) activity in a game. The log data stored in the raw database is not processed and thus may be referred to as raw data. The log data stored in the raw database may include game metadata, gameplay records, or data related to goods obtainable through play. The structure of the database or the content of the log data stored in the database may be different for each game. Also, the log data may contain data unnecessary for data processing of the server 100. Accordingly, one of the server 100 or the game service provider server 130 may select data to be used for data processing, extract only the selected data, and create a new database. The new database may include users' login information, character information, billing information, play information, online money acquisition information, and online money usage information.

In detail, the log data may be stored in one database and may be stored in a plurality of databases according to data attributes, data creation dates, and the like. The server 100 or the game service provider server 130 may integrate the log data stored in the plurality of databases.

Also, the server 100 or the game service provider server 130 may extract necessary data from the integrated log data and create a new database. The server 100 or the game service provider server 130 may use a predetermined algorithm in order to create a new database. The server 100 or the game service provider server 130 may transform the value of the raw data into a standardized value that can be processed by the server 100 on the basis of the predetermined algorithm. Also, the server 100 or the game service provider server 130 may transform the structure of the raw database including the raw data into the standardized structure of the database on the basis of the predetermined algorithm.

The server 100 may acquire reference data for analyzing a user's tendency on the basis of at last one piece of data included in the new database. Also, the server 100 may analyze the user's tendency and determine recommended character information, recommended item information, and recommended content information according to a result of the analysis.

The operation of the server 100 will be described in detail below.

Figure 2:
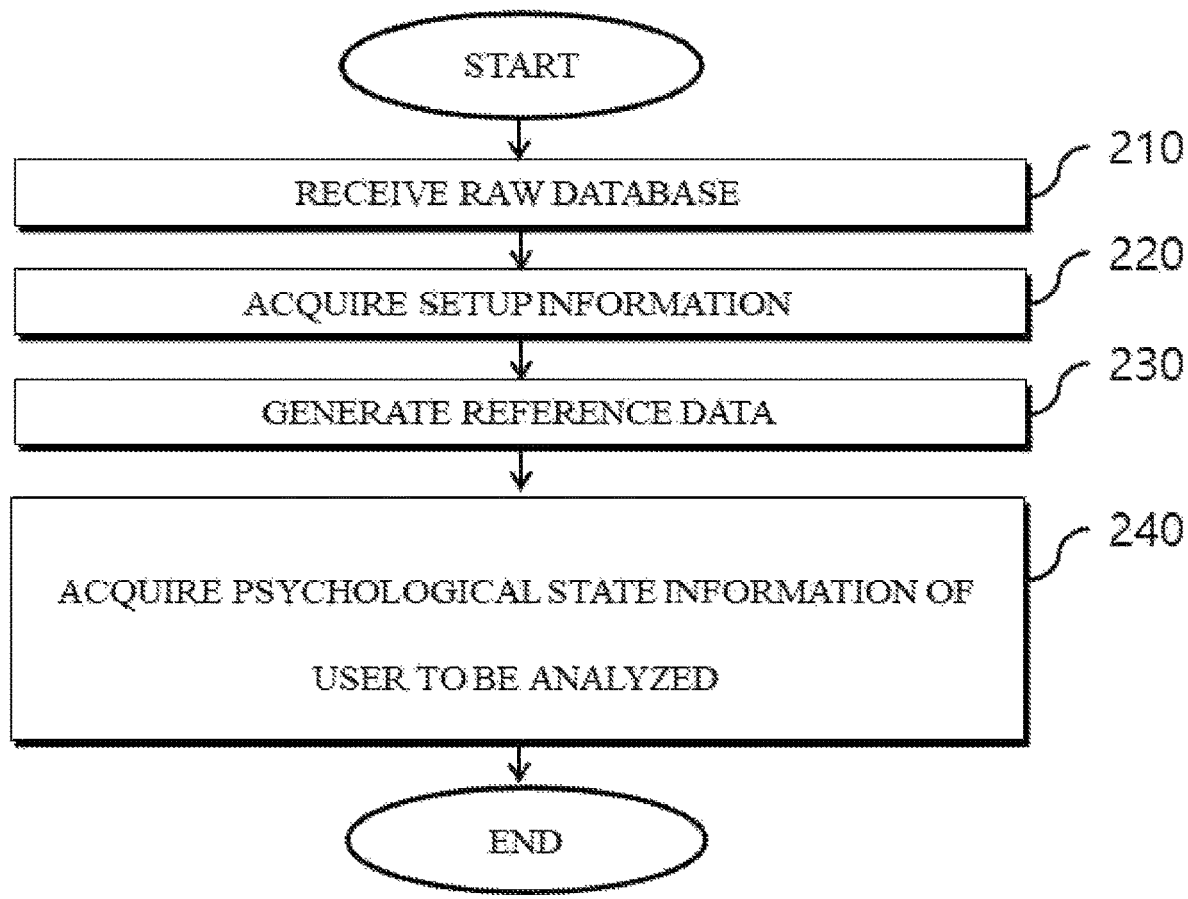
FIG. 2 is a flowchart showing an operation of a server according to an embodiment of the present disclosure.

FIG. 2 is a flowchart showing an operation of a server according to an embodiment of the present disclosure.

The server 100 may analyze a user's psychology with a plurality of models to classify the user. The plurality of models may be models for analyzing users' tendencies. The user may be classified by one model into at least one tendency. The server 100 may classify the user into a plurality of tendencies with a plurality of models. The server 100 may apply log data of the user to at least one of the plurality of models to analyze the user's psychology. In order to apply a plurality models to the log data of the user, the server 100 may have to generate reference data for each of the plurality of models. The reference data may be a value for classifying the user's psychological state. The server 100 may classify the user's psychological state by classifying the log data of the user on the basis of the reference data.

The server 100 may perform an operation of receiving the raw database from the game service provider server 130 (210). Also, to acquire reference data corresponding to one of a plurality of models from the raw database, the server 100 may perform an operation of acquiring setup information of at least one module (220).

One of the plurality of models may include at least one module. A module may be hardware or software which has one function. The server 100 may use a plurality of pieces of data included in the raw database to classify the user's tendency. A module may derive one piece of data included in the raw database. Accordingly, the server 100 may use a plurality of modules to derive a plurality of pieces of data from the raw database.

One module may be repeatedly used by a plurality of models. However, a data type required by models, the range of analyzed data, etc. may vary. Accordingly, the server 100 may make setup information of modules different depending on models.

The server 100 may acquire setup information from the memory. However, the present disclosure is not limited thereto. The server 100 may receive setup information from an external device in a wired or wireless manner. Also, the server 100 may receive setup information from a user. The setup information may be acquired on the basis of the raw database.

The server 100 may perform an operation of generating reference data from data of users included in the raw database on the basis of at least one module which is set on the basis of the setup information (230). In the raw database, log data of a plurality of users may be recorded. The server 100 may generate reference data on the basis of the log data of the plurality of users. Since the server 100 generates reference data using the trend of the log data of the plurality of users, the psychology of a user to be analyzed may be analyzed using the general psychology of users.

The log data of the plurality of users may include the users' login information, character information, item usage information, billing information, play information, online money acquisition information, and online money usage information. The log data may be data copied from the raw database or data processed on the basis of data stored in the raw database.

A user's login information is information about the user's logging in or out of a game service. The user's login information may include at least one of the user's login time or the user's logout time. The database of the server 100 may include the user's login time and logout time for a predetermined period.

A user's character information is information related to a game character owned by the user. The game service may provide one or more characters, and the user may own at least one of the provided characters.

The character information may include at least one of information related to the number of characters owned by the user, information about the current level of a character owned by the user, information related to a level variation over time of a character owned by the user, identification information of a character owned by the user, or identification information of a character currently being used among the characters owned by the user.

Each of the characters owned by the user may level up while the user is playing the game. The game service provides a reward, which indicates experience points, for the character when the user is playing the game, and the character may level up according to the experience points. The information about the current level of a character owned by the user may include information related to the current experience points of the character or information about the current level. The information about the current level and the information related to the current experience points of the character may be expressed with real numbers.

The information related to a level variation over time of a character owned by the user may indicate a development rate of the character owned by the user. For example, the level variation over time may indicate a change in the level of a character with respect to a duration for which the user uses the game service. Also, the level variation over time may indicate a change in the level of a character from when the user starts to use the game service. Also, the level variation over time may indicate a change in the level of a character with respect to the number of times the user plays the game. Also, the level variation over time may indicate a change in the level of a character with respect to the number of times the user plays the game using the corresponding character. The number of times the user plays the game may be determined assuming that one time is defined as a cycle from when the user attempts a predetermined goal provided by the service to when it is determined whether the goal is achieved.

The game service may provide a plurality of characters. Each of the plurality of characters may correspond to the identification information. The character information may include identification information of a character owned by the user. Also, when the user possesses a plurality of characters, the character information may include identification information of a character currently being used by the user among the plurality of characters.

Item usage information may include information related to a user's item usage or information related to a plurality of items used by the user.

The items refer to various consumables provided by the game service. When the user uses an item, the character's physical strength value may be increased, the character's experience point value may be increased, the character's level value may be increased, or the character's ability point value may be increased. However, the present disclosure is not limited thereto, and the game service may provide various functional items if necessary.

The information related to the user's item usage may refer to the number of items used by the user. The number of items used by the user may refer to the number of items used for a specific period. The server 100 may acquire the number of items used by the user for various periods of time in order to analyze the user's tendency.

The information related to a plurality of items used by the user may refer to a usage history of an item used by the user. Alternatively, the information related to a plurality of items used by the user may refer to a list of the identification information of the item used by the user. Alternatively, the information related to a plurality of items used by the user may refer to the identification information of the item used by the user and the number of times the user uses the item corresponding to the identification information.

Billing information may include information related to the number of times a user is billed or information related to the billed amount for the user. The billing refers to a game service provider charging a user a fee in return for providing the game service. Through the billing, the user may purchase at least one of items, content, and characters that can be used in the game.

The information related to the number of times the user is billed may be a value proportional to the number of times the user pays money to the game service company. Also, the information related to the billed amount for the user may be a value proportional to the amount paid by the user to the game service company.

Play information may be information related to a user's history of using content in the game. The play information may include information related to what content the user has played, the difficulty of the content, whether the user wins or loses with respect to the content, experience points obtained when winning, and a play time.

In addition, the play information may include at least one of information about the number of times the user plays in Player Versus Player (PvP) mode, information related to a win rate in the PvP mode, information about the number of times the user plays one of the characters owned by the user, information related to a time in which one piece of content is used, information related to the number of failures while playing the content, information related to the number of attempts to play the content, information related to the user's average play time per day, or information related to the user's total play time.

A PvP mode represents a mode in which users compete against each other in a game. A Player Versus Environment (PvE) mode represents a mode in which users compete against game environments (here, referring to artificial intelligence for providing a game service). Game content is largely classified as the PvP mode and the PvE mode.

Information about the number of times the user plays in the PvP mode is information corresponding to the number of times the user plays the PvP mode. The server 100 may determine a cycle from when the user enters the PvP mode to when a winning or losing result is output as one instance of playing.

The information related to a win rate in the PvP mode may be information related to the ratio of the number of times the user has won in the PvP mode to the number of times the user has played in the PvP mode. The information related to a win rate may refer to a win rate for a predetermined period. The predetermined period may be one day, one week, four weeks, one month, one year, or the like. The information related to the win rate in the PvP mode may have a proportional relationship with the ratio.

The information about the number of times the user plays one of the characters owned by the user may be stored in a separate database for each character owned by the user. The user may play the game using one character. The server 100 may determine a cycle from when the user starts the game using one character to when a result of the game is output as one instance of playing.

The game service provider may provide content to the user. The content refers to various avenues of entertainment provided by the game service provider to the user. For example, the content may be largely classified as the PvE mode or the PvP mode. The PvE mode or the PvP mode may be further classified into various subdivided modes. Also, the content may include content that provides online money, content that provides items, or content that is available only a predetermined number of times per day depending on characteristics.

The information related to a time in which one piece of content is used may be stored for each piece of content. The time in which one piece of content is used may refer to an accumulation of time from when the user plays the content to when a result is output. The information related to a time in which one piece of content is used may be proportional to a time in which the content is used.

The information related to the number of attempts to play the content indicates information related to the number of times the user attempts one piece of content included in the PvE mode or the PvP mode. The information related to the number of attempts to play the content may be stored for each piece of content. The number of attempts to play the content indicates the number of times the user plays the content. The information related to the number of attempts to play the content may have a value proportional to the number of attempts to play the content.

The information related to the number of failures while playing the content indicates information related to the number of times the result, which is output after the user attempts the content, is a failure. The information related to the number of failures of the content may be stored for each piece of content. The number of failures of the content indicates the number of times the result obtained when the user plays the content is a failure. The information related to the number of failures while playing the content may have a value proportional to the number of failures while playing the content.

The user's average play time per day may indicate an average amount of time per day that the user uses the game service. The information related to the user's average play time per day may be information proportional to the average play time per day.

The user's total play time may indicate the total time accumulated until the user logs out of the game service after logging in to the game service. The information related to the user's total play time may be information proportional to the total play time.

Online money acquisition information may include at least one of information about the amount of acquired online money, information about the time of acquisition of the online money, and information about the reason for the acquisition of the online money.

Online money is an exchange means for purchasing items, content, etc. in a game and is a measure of exchange value for goods or services. Users may acquire online money through various routes. For example, a user may acquire online money after paying the amount charged by the game service provider, acquire online money after playing the content, or acquire online money from another user.

When the user acquires the online money, information related to the acquisition may be recorded in a database as online money acquisition information. For example, a database may include at least one of the information about the amount of acquired online money, the information about the time of acquisition of the online money, or the information about the reason for the acquisition of the online money. The acquisition reason may be expressed by an index. That is, the index may include at least one of an index indicating that online money is acquired from another user, an index indicating that online money is acquired after the content is played, and an index indicating that online money is acquired after the charged amount is paid.

Online money usage information may include at least one of information about the amount of used online money, information about the use time of online money, and information about content, an item, or the like acquired using online money.

Users may acquire various items or pieces of content using the online money. For example, a user may use the online money to purchase an item for decorating a character, purchase an item for increasing a character's ability points, or purchase a right to use specific content. When the user uses the online money, information related to the use may be recorded in a database as online money usage information. For example, the database may include at least one of information about the amount of used online money, information about the use time of online money, and information about content, an item, or the like acquired using online money. The information about content, an item, or the like acquired using online money may be expressed by an index. That is, the index may include at least one of an index indicating that one item has been acquired or an index indicating that one piece of content has been acquired.

The server 100 may perform an operation of acquiring psychological state information of the user to be analyzed on the basis of the acquired reference data (240).

The operation in which the server 100 generates reference data (230) will be described in further detail below.

Figure 3:
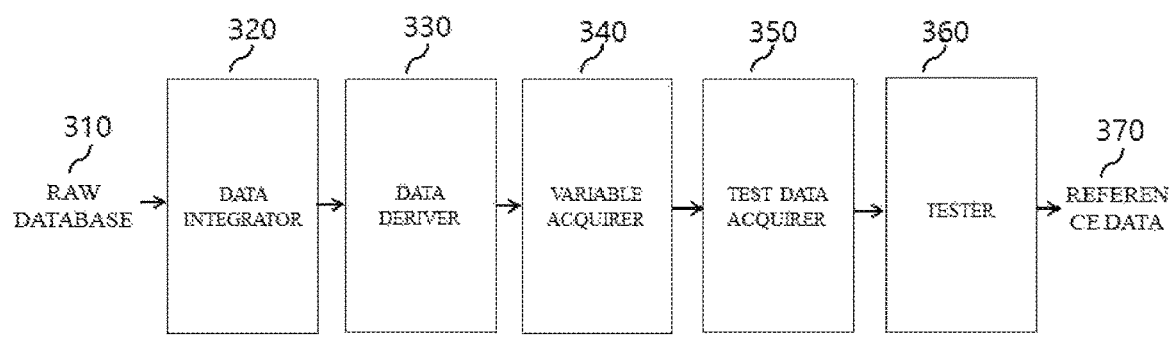
FIG. 3 illustrates a process of generating reference data according to an embodiment of the present disclosure.

FIG. 3 illustrates a process of generating reference data according to an embodiment of the present disclosure.

The operation of generating reference data (230) in FIG. 2 may be performed on the basis of at least one of a data integrator 320, a data deriver 330, a variable acquirer 340, a test data acquirer 350, and a tester 360 included in the server 100. The data integrator 320, the data deriver 330, the variable acquirer 340, the test data acquirer 350, or the tester 360 may be a module included in a model.

The server 100 may receive a raw database 310. The server 100 may include the data integrator 320. The data integrator 320 may integrate the raw database 310 recorded in at least one server. Also, the data integrator 320 may integrate data distributed in the raw database 310. The data integrator 320 may extract data required for acquiring reference data from the raw database 310 and integrate the extracted data. Here, the extraction may be a process of copying the required data from the raw database 310. The data integrator 320 may acquire an integrated database. The types of data required for acquiring reference data may be determined in advance.

The server 100 may include the data deriver 330. The data deriver 330 may generate required data using the integrated database. The data deriver 330 may acquire a derived database using data included in the integrated database. Here, the derivation may be a process of calculating, combining, or selecting data. The derived database may include data required for the server 100 to acquire reference data for analyzing users' psychology. Also, the derived database may include a value which is more useful to generate users' psychological models than a value of the integrated database.

The server 100 may include the variable acquirer 340. The variable acquirer 340 may select a variable required for a module from the derived database. At least one module included in one model may use only some data of the derived database. The variable acquirer 340 may select a variable on the basis of the type of a module included in a psychological analysis model. Variable types according to module types may be determined in advance.

The server 100 may include the test data acquirer 350. The test data acquirer 350 may generate a test database by combining at least one selected variable. A module may use log data of a plurality of users. A variable may correspond to one user. Accordingly, the test data acquirer 350 may acquire a test database by collecting variables of a plurality of users. Also, a plurality of modules may share variables. One module may use a plurality of variables. Accordingly, the test data acquirer 350 may acquire a test database suited to a module type by combining variables selected by the variable acquirer 340.

The server 100 may include the tester 360. The tester 360 may perform a test on the basis of the test database. The test is an operation of generating reference data 370 for classifying a plurality of users' psychological states by analyzing log data of the users.

Using the reference data 370, the server 100 may classify an arbitrary user's psychological state on the basis of log data of the arbitrary user.

A process of generating reference data will be described in detail below with reference to FIGS. 4 to 19.

Figure 4:
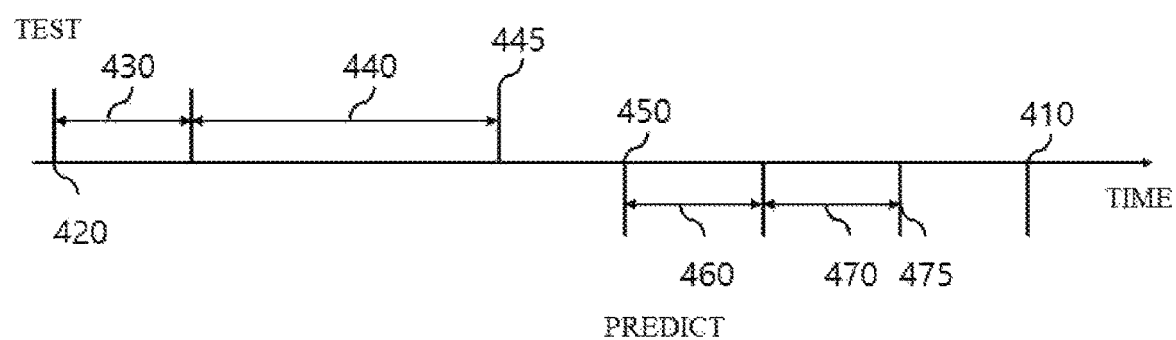
FIG. 4 illustrates data used by a server according to an embodiment of the present disclosure.

FIG. 4 illustrates data used by the server 100 according to an embodiment of the present disclosure.

As described above, a test is an operation of generating reference data for classifying a plurality of users' psychological states by analyzing log data of the users. Also, prediction is an operation of classifying a psychological state of the user to be analyzed by analyzing log data of a user to be analyzed on the basis of reference data.

The server 100 may analyze users' psychology at a current time point 410. The server 100 may automatically and periodically analyze game users' psychology. Also, the server 100 may manually analyze game users' psychology when the game service provider wants. The server 100 may analyze game users' psychology on the basis of an analysis time included in setup information.

The server 100 may acquire a game service sign-up date 420 of the user included in the setup information. The server 100 may acquire the game service sign-up date 420 of the user from the raw database. The server 100 may acquire a game service sign-up date 420 of each user.

The server 100 may acquire a standby period 430 included in the setup information. The server 100 may not perform a test on the user during the standby period 430 from the game service sign-up date 420. The user may establish his or her play style while attempting several things during a predetermined period of time after the game service sign-up date 420. Accordingly, when the server 100 analyzes a period of time immediately after the game service sign-up date 420 of the user, no psychological state may be found. Consequently, the server 100 may not perform a test on the user during the standby period 430.

The server 100 may acquire an analysis period 440 included in the setup information. In the analysis period 440, the server 100 collects log data of the user. The analysis period 440 may be immediately after the standby period 430. The server 100 may collect log data of the user during the analysis period 440. It is necessary to accumulate log data during a predetermined period of time in order to derive psychological characteristics of the user. Accordingly, the server 100 may collect log data of the user during the analysis period 440.

The server 100 may generate reference data on the basis of a final date 445 of the analysis period 440. The server 100 may generate reference data using the user's log data of the analysis period 440.

The server 100 may receive log data of a user to be analyzed. For example, the server 100 may receive a game service sign-up date 450 of the user to be analyzed. The user to be analyzed may establish his or her game style while attempting several things during a predetermined period of time. Accordingly, the server 100 may defer a psychological analysis of the user to be analyzed for a standby period 460. The server 100 may collect log data of the user to be analyzed during an analysis period 470. The server 100 may analyze psychology of the user to be analyzed on the basis of the collected log data and a psychological analysis model. The psychological analysis model may use reference data derived from a test. The server 100 may acquire a result of analyzing psychology of the user to be analyzed on the basis of the last day of the analysis period 470.

Figure 5:
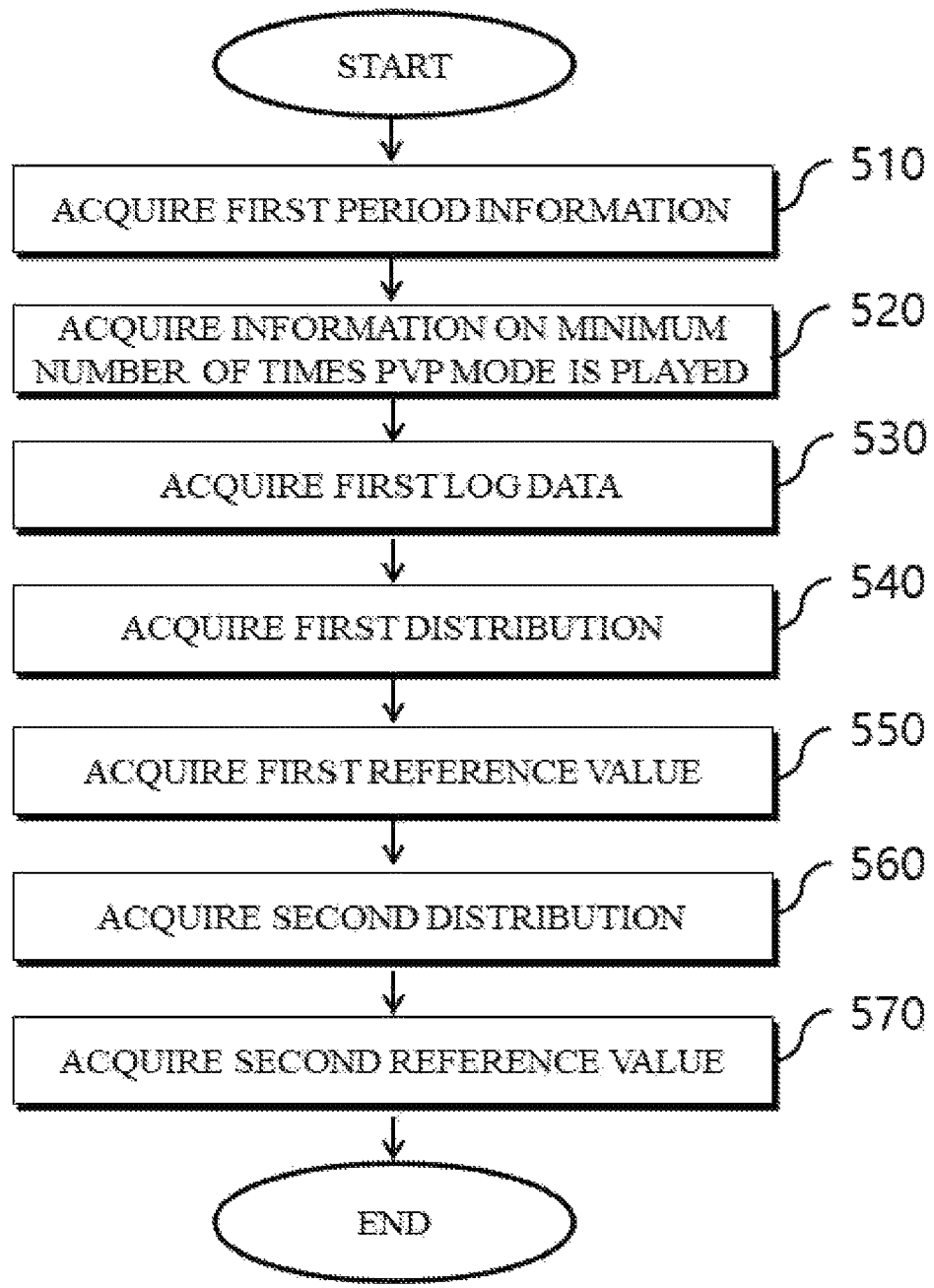
FIG. 5 is a flowchart illustrating a process of generating reference data of a first model according to an embodiment of the present disclosure.

FIG. 5 is a flowchart illustrating a process of generating reference data of a first model according to an embodiment of the present disclosure.

The first model is a psychological model for distinguishing a user who prefers the PvP mode but has a low win rate in the PvP mode. When a user prefers the PvP mode but has a low win rate in the PvP mode, the user has negative feeling about the game service and thus may not use the game service for a long time. The server 100 may select such a user and provide the user with a game service suited to the user.

The server 100 may perform the operation of acquiring setup information (220). The server 100 may acquire setup information from the memory. Also, the server 100 may acquire setup information from an external device in a wired or wireless manner. The server 100 may perform an operation of acquiring first period information from the setup information (510).

The first period information may indicate a period of time in which log data required for applying the first model is collected. Referring to FIG. 4, the first period information may correspond to the analysis period 440. Also, the server 100 may perform an operation of acquiring information on the minimum number of times the PvP mode is played from the setup information (520). The information on the minimum number of times the PvP mode is played may be acquired from the memory.

The server 100 may perform the operation of generating reference data (230). The server 100 may perform an operation of acquiring first log data, which corresponds to the first period information, of users who have used the PvP mode the minimum number of times the PvP-mode is played or more from the raw database (530). The first log data may be included in the test database output by the test data acquirer 350. According to the first model, the server 100 may analyze users who have used the PvP mode the minimum number of times the PvP mode is played or more. This is because, when the user rarely uses the PvP mode, the server 100 cannot analyze the user's psychological state on the basis of the first model.

The server 100 may perform an operation of acquiring a first distribution of users on a first axis, which represents a PvP content play ratio, on the basis of the first log data (540). The PvP content play ratio may indicate a ratio of the number of times a user plays PvP content to the number of times the user plays all content. The server 100 may acquire the PvP content play ratio on the basis of log data of a plurality of users included in the first log data.

Also, the server 100 may perform an operation of acquiring a first reference value included in reference data on the basis of the first distribution (550). The first reference value may be a value for determining whether the PvP content play ratio is high or low. A method of acquiring the first distribution and the first reference value will be described in further detail with reference to FIGS. 6 and 7.

Figure 6:
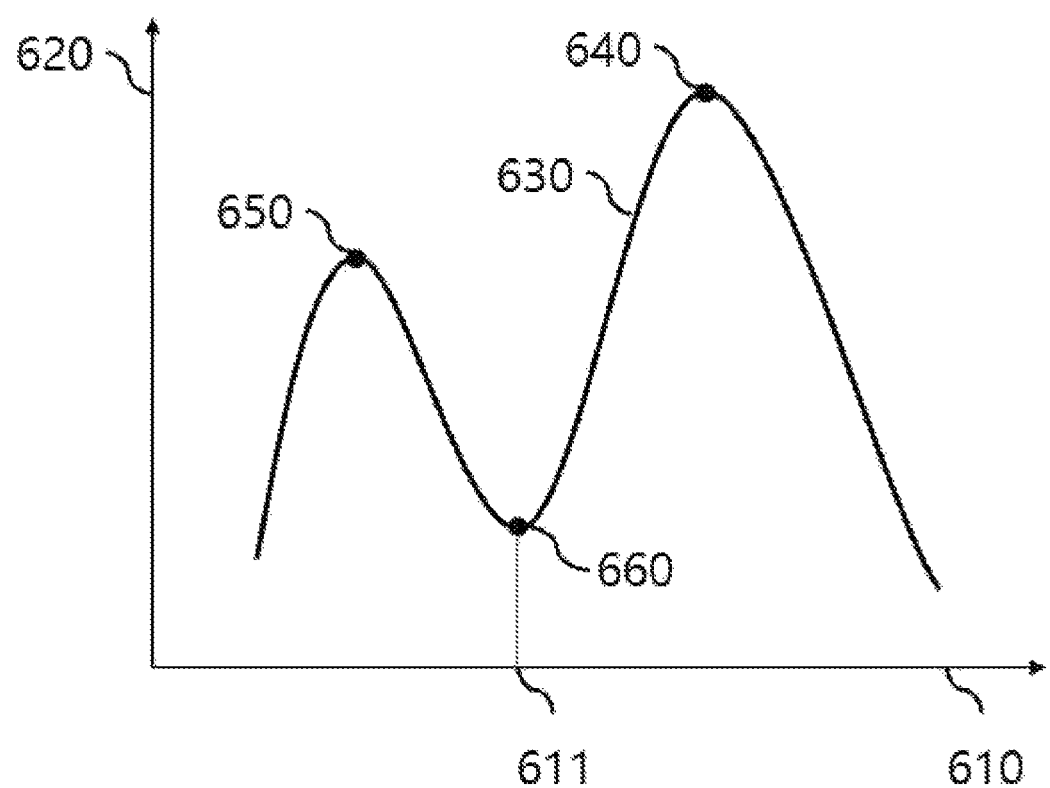
FIG. 6 is a graph showing a first distribution to a twenty-eighth distribution according to an embodiment of the present disclosure.

FIG. 6 is a graph showing a first distribution to a twenty-eighth distribution according to an embodiment of the present disclosure.

FIG. 6 may show a first distribution to a twenty-eighth distribution. However, FIG. 6 will be described below on the basis of the first distribution for convenience of description.

Referring to FIG. 6, a horizontal axis 610 may denote a PvP content play ratio. The horizontal axis 610 may correspond to the first axis. A vertical axis 620 may denote the number of users corresponding to the PvP content play ratio.

The server 100 may acquire a first distribution on the basis of first log data. The first distribution may be shown as a graph 630. The server 100 may acquire a first maximum point 640. The server 100 may determine, as the first maximum point 640, a maximum point having the largest frequency among maximum points of the graph 630 representing the first distribution. Also, the server 100 may acquire a second maximum point 650. The server 100 may determine, as the second maximum point 650, a maximum point having a second largest frequency among the maximum points of the graph 630 representing the first distribution.

The server 100 may acquire a first minimum point 660 between the first maximum point 640 and the second maximum point 650. For example, the server 100 may acquire a minimum point which appears for the first time from the first maximum point 640 toward the second maximum point 650 as the first minimum point 660. Also, the server 100 may acquire a minimum point which appears for the first time from the second maximum point 650 toward the first maximum point 640 as the first minimum point 660. In addition, the server 100 may acquire a point indicating the minimum number of times between the first maximum point 640 and the second maximum point 650 as the first minimum point 660.

The server 100 may determine a horizontal-axis value 611 of the first minimum point 660 as a first reference value.

Figure 7:
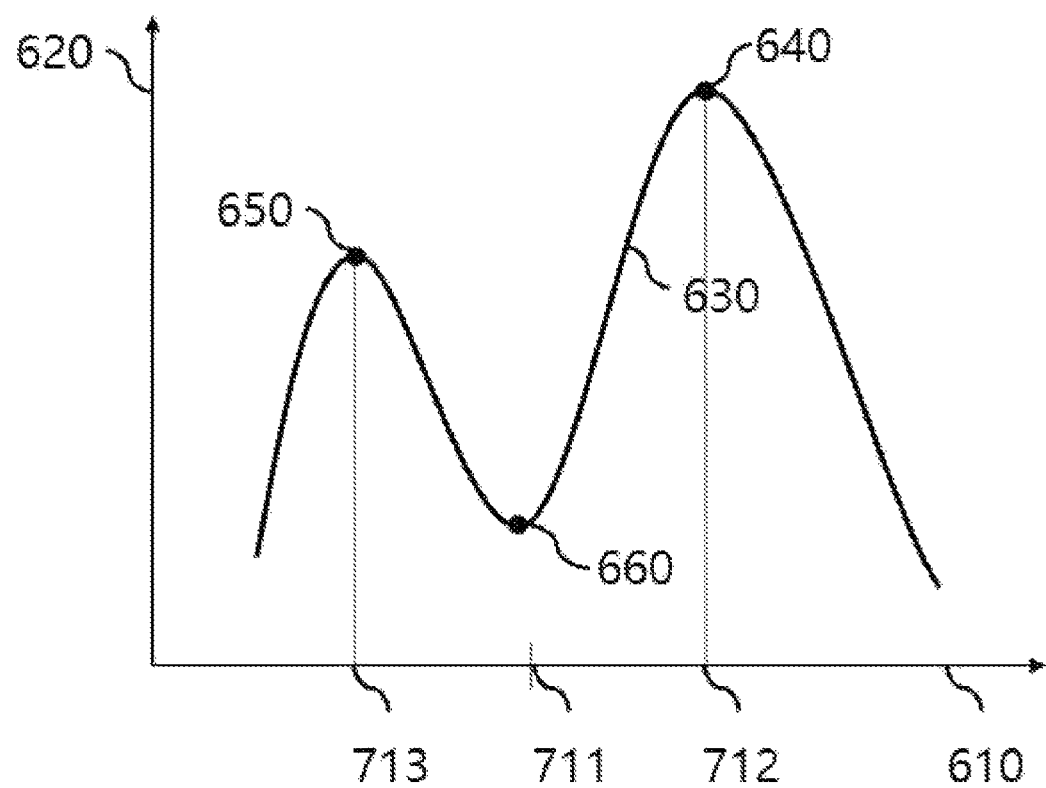
FIG. 7 is a graph showing a first distribution to a twenty-eighth distribution according to an embodiment of the present disclosure.

FIG. 7 is a graph showing a first distribution to a twenty-eighth distribution according to an embodiment of the present disclosure.

FIG. 7 may show a first distribution to a twenty-eighth distribution. However, FIG. 7 will be described below on the basis of the first distribution for convenience of description.

Referring to FIG. 7, a horizontal axis 610 may denote a PvP content play ratio. The horizontal axis 610 may correspond to the first axis. A vertical axis 620 may denote the number of users corresponding to a PvP content play ratio.

The server 100 may acquire a first distribution on the basis of first log data. The first distribution may be shown as a graph 630. The server 100 may acquire a first maximum point 640. The server 100 may determine, as the first maximum point 640, a maximum point having the largest frequency among maximum points of the graph 630 representing the first distribution. Also, the server 100 may acquire a second maximum point 650. The server 100 may determine, as the second maximum point 650, a maximum point having a second largest frequency among the maximum points of the graph 630 representing the first distribution.

The server 100 may determine an average value 711 of a horizontal-axis value 712 of the first maximum point 640 and a horizontal-axis value 713 of the second maximum point 650 as a first reference value.

Referring back to FIG. 5, the server 100 may perform an operation of acquiring a second distribution of users on a second axis, which represents a win rate in the PvP mode, on the basis of the first log data (560). The win rate in the PvP mode may indicate a ratio of the number of times a user has won in the PvP mode to the total number of times the user has played in the PvP mode. The second axis may be described in the same way as the first axis which has already been described.

Also, the server 100 may perform an operation of acquiring a second reference value included in reference data on the basis of the second distribution (570).

Referring to FIGS. 6 and 7, the horizontal axis 610 may denote a win rate in the PvP mode on the basis of log data of a user. The horizontal axis 610 may correspond to the second axis. The vertical axis 620 may denote the number of users corresponding to the win rate in the PvP mode.

The server 100 may acquire the second distribution on the basis of the first log data. The second distribution may be shown as the graph 630. The server 100 may determine the second reference value on the basis of the second distribution. The second reference value may be a value for determining whether a win rate in the PvP mode is high or low. A method of acquiring a reference value on the basis of distribution has already been described with reference to FIGS. 6 and 7, and thus the description thereof is not reiterated.

The server 100 may perform an operation of acquiring psychological state information of the user to be analyzed using the first reference value and the second reference value (240). For example, when a PvP content play ratio of the user to be analyzed is higher than the first reference value and a win rate in the PvP mode is lower than the second reference value, the server 100 may determine a psychological state of the user to be analyzed as being highly likely to quit the game. The server 100 may output an analysis result. The user or the server 100 may take action according to the analysis result.

Figure 8:
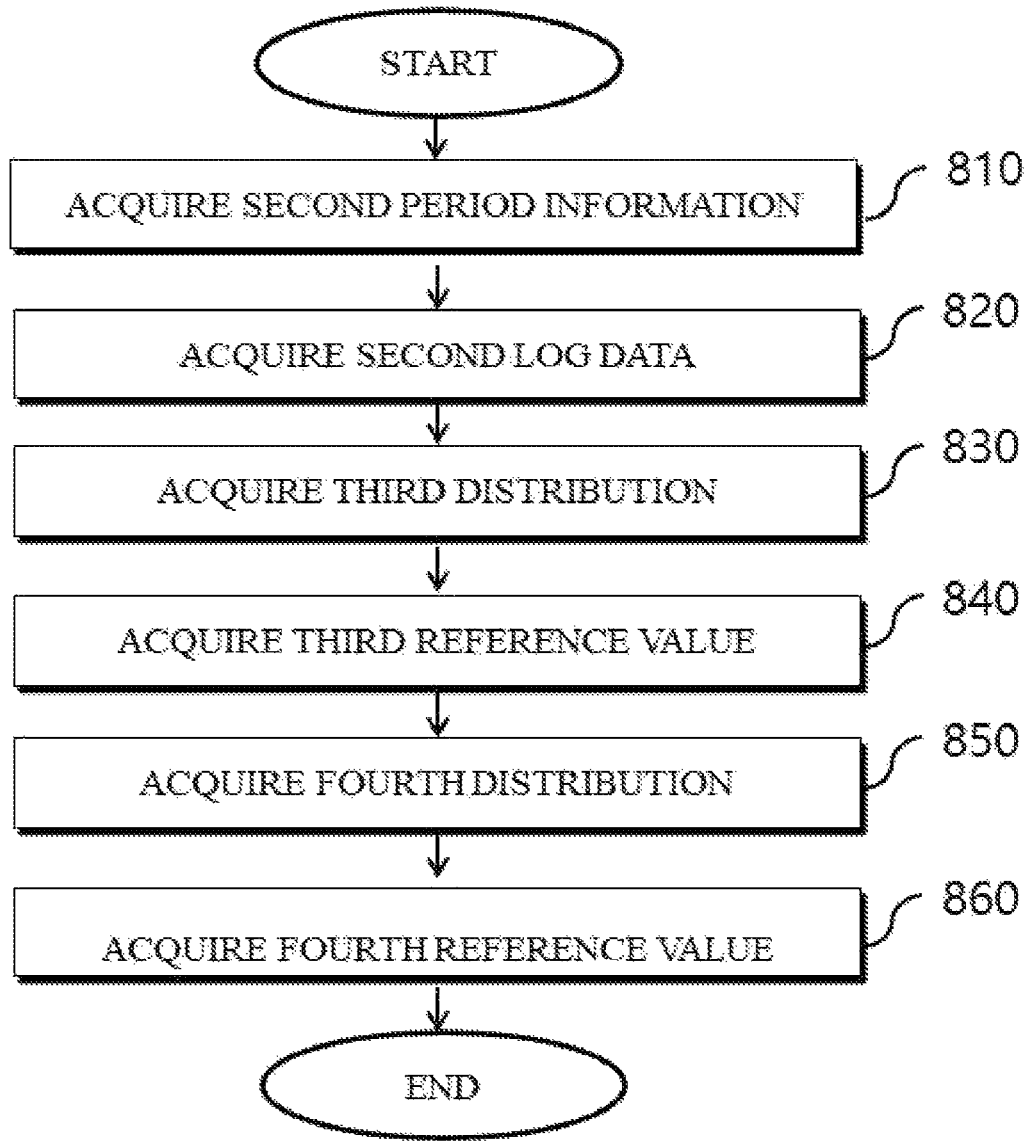
FIG. 8 is a flowchart illustrating a process of generating reference data of a second model according to an embodiment of the present disclosure.

FIG. 8 is a flowchart illustrating a process of generating reference data of a second model according to an embodiment of the present disclosure.

The second model is a psychological model for distinguishing a user who has a small number of characters and purchases many items that change an appearance of the characters. An item that changes the appearance of a character may be a type of item that changes the appearance of one character and that can be used in the game. For example, an item that changes the appearance of a character may be associated with weapons, clothes, caps, shoes, and ornaments for the character. The item that changes the appearance of a character may have unique identification information.

When a user has a small number of characters and purchases many items that change an appearance of the characters, the user may have a tendency to value a change in the appearance of a character. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner. The server 100 may perform an operation of acquiring second period information from the setup information (810).

The second period information may indicate a period of time in which log data required for applying the second model is collected. Referring to FIG. 4, the second period information may correspond to the analysis period 440.

The server 100 may perform the operation of generating reference data (230). The server 100 may perform an operation of acquiring second log data corresponding to the second period information from the raw database (820). The second log data may be included in the test database output by the test data acquirer 350.

The server 100 may perform an operation of acquiring a third distribution of users on a first axis, which represents the number of characters owned by a user, on the basis of the second log data (830). The server 100 may acquire the number of characters owned by a plurality of users included in the second log data on the basis of log data of the users.

Also, the server 100 may perform an operation of acquiring a third reference value included in reference data on the basis of the third distribution (840). Referring to FIGS. 6 and 7, the horizontal axis 610 may denote the number of characters owned by a user on the basis of log data of the user. The horizontal axis 610 may correspond to the first axis. The vertical axis 620 may denote the number of users corresponding to the number of characters owned by the user. The server 100 may acquire the third distribution on the basis of the second log data. The third distribution may be shown as the graph 630. The server 100 may determine the third reference value on the basis of the third distribution. The third reference value may be a value for determining whether the number of characters owned by a user is large or small. A process of acquiring a reference value on the basis of distribution has already been described with reference to FIGS. 6 and 7, and thus the description thereof is not reiterated.

The server 100 may perform an operation of acquiring a fourth distribution of users on a second axis, which represents information related to a ratio of the amount of online money used for an item that changes the appearance of a character, on the basis of the second log data (850). The information related to a ratio of the amount of online money used for an item that changes the appearance of a character may indicate a ratio of the amount of online money used by a user for an item that changes the appearance of a character to the total amount of online money used by the user. Also, the information related to a ratio of the amount of online money used for an item that changes the appearance of a character may be information directly or inversely proportional to the ratio. The second axis may be described in the same way as the first axis which has already been described.

Also, the server 100 may perform an operation of acquiring a fourth reference value included in reference data on the basis of the fourth distribution (860).

Referring to FIGS. 6 and 7, the horizontal axis 610 may denote information related to a ratio of the amount of online money used for an item that changes the appearance of a character on the basis of log data of a user. The horizontal axis 610 may correspond to the second axis. The vertical axis 620 may denote the number of users corresponding to the information related to a ratio of the amount of online money used for an item that changes the appearance of a character.

The server 100 may acquire the fourth distribution on the basis of the second log data. The fourth distribution may be shown as the graph 630. The server 100 may determine the fourth reference value on the basis of the fourth distribution. The fourth reference value may be a value for determining whether a ratio of the amount of online money used for an item that changes the appearance of a character is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the third reference value and the fourth reference value (240). For example, when the number of characters owned by the user to be analyzed is smaller than the third reference value and a ratio of the amount of online money used for an item that changes the appearance of a character is larger than the fourth reference value, the server 100 may determine a psychological state of the user to be analyzed as being highly likely to quit the game. The server 100 may output an analysis result. The user or the server 100 may take action according to the analysis result.

Figure 9:
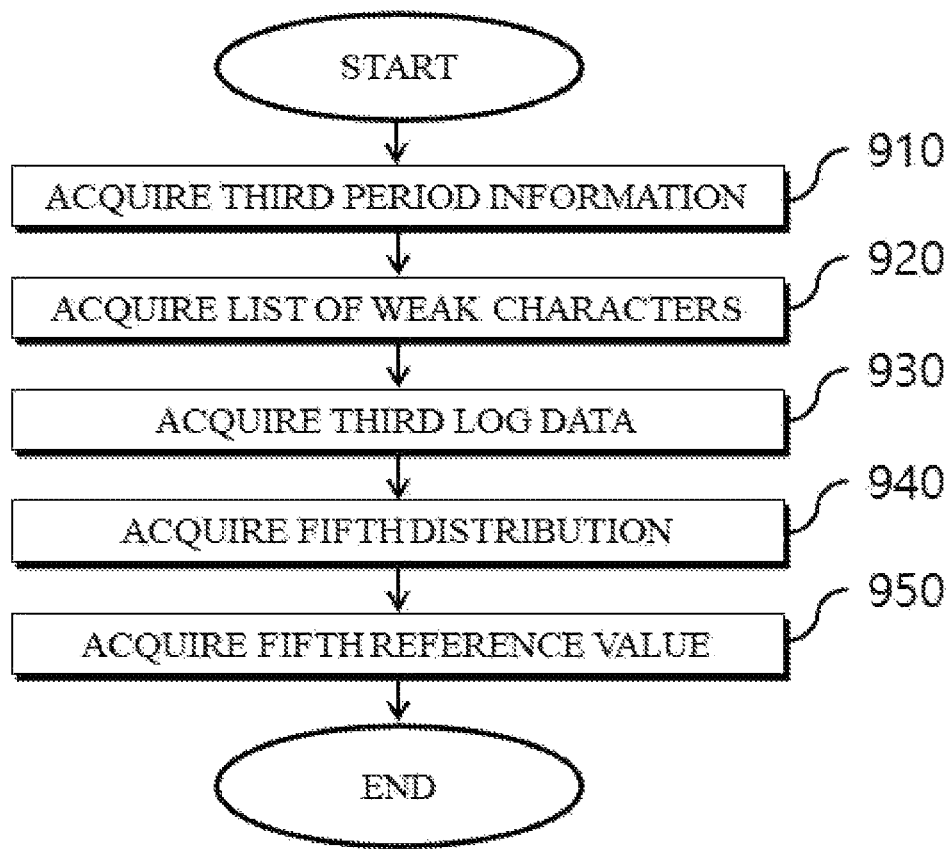
FIG. 9 is a flowchart illustrating a process of generating reference data of a third model according to an embodiment of the present disclosure.

FIG. 9 is a flowchart illustrating a process of generating reference data of a third model according to an embodiment of the present disclosure.

The third model is a psychological model for distinguishing a user who uses a relatively weak character. Since it is difficult to play the game using a relatively weak character, users may not enjoy the game for a long time. However, although a user uses a relatively weak character, the user may feel novelty in the game by frequently changing characters or purchasing many items with online money and may continuously use the game service. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring third period information from the setup information (910). The third period information may indicate a period of time in which log data required for applying the third model is collected. Referring to FIG. 4, the third period information may correspond to the analysis period 440.

The server 100 may perform an operation of acquiring a list of relatively weak characters from the setup information (920). The list of weak characters may be input to the raw database in advance by a game designer. Also, the server 100 may receive a list of weak characters from an external device in a wired or wireless manner. The list of weak characters may include identification information of at least one character.

However, the present disclosure is not limited thereto. The server 100 may automatically acquire a list of weak characters. Log data of users who have used at least one piece of content in the game may be acquired from the raw database. The server 100 may derive a type of character used when a user fails while playing in at least one piece of content. Also, the server 100 may acquire a ratio of each individual character's failures while playing at least one piece of content. A ratio of failures while playing at least one piece of content may indicate a ratio of the number of failures to the total number of attempts to play at least one piece of content with a character. The server 100 may acquire a list of weak characters using characters which have a high ratio of failures while playing at least one piece of content.

The server 100 may perform the operation of generating reference data (230). The server 100 may perform an operation of acquiring third log data corresponding to the third period information from the raw database (930). The third log data may be included in the test database output by the test data acquirer 350.

The server 100 may perform an operation of acquiring a fifth distribution of users on a first axis, which represents the number of times a user uses a character included in the list of weak characters, on the basis of the third log data (940). The server 100 may acquire the number of times a user has used a character included in the list of weak characters on the basis of log data of a plurality of users included in the third log data.

Also, the server 100 may perform an operation of acquiring a fifth reference value included in reference data on the basis of the fifth distribution (950). Referring to FIGS. 6 and 7, the horizontal axis 610 may denote the number of times a user has used a character included in the list of weak characters on the basis of log data of the user. The horizontal axis 610 may correspond to the first axis. The vertical axis 620 may denote the number of users corresponding to the number of times the user has used a character included in the list of weak characters. The server 100 may acquire the fifth distribution on the basis of the third log data. The fifth distribution may be shown as the graph 630. The server 100 may determine the fifth reference value on the basis of the fifth distribution. The fifth reference value may be a value for determining whether the number of times a user has used a character included in the list of weak characters is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the fifth reference value (240). For example, when the number of times a user to be analyzed has used a character included in the list of weak characters is larger than the fifth reference value, the server 100 may determine a psychological state of the user to be analyzed as being likely to be bored with the game service soon. The server 100 may output an analysis result. The user or the server 100 may take action according to the analysis result.

Figure 10:
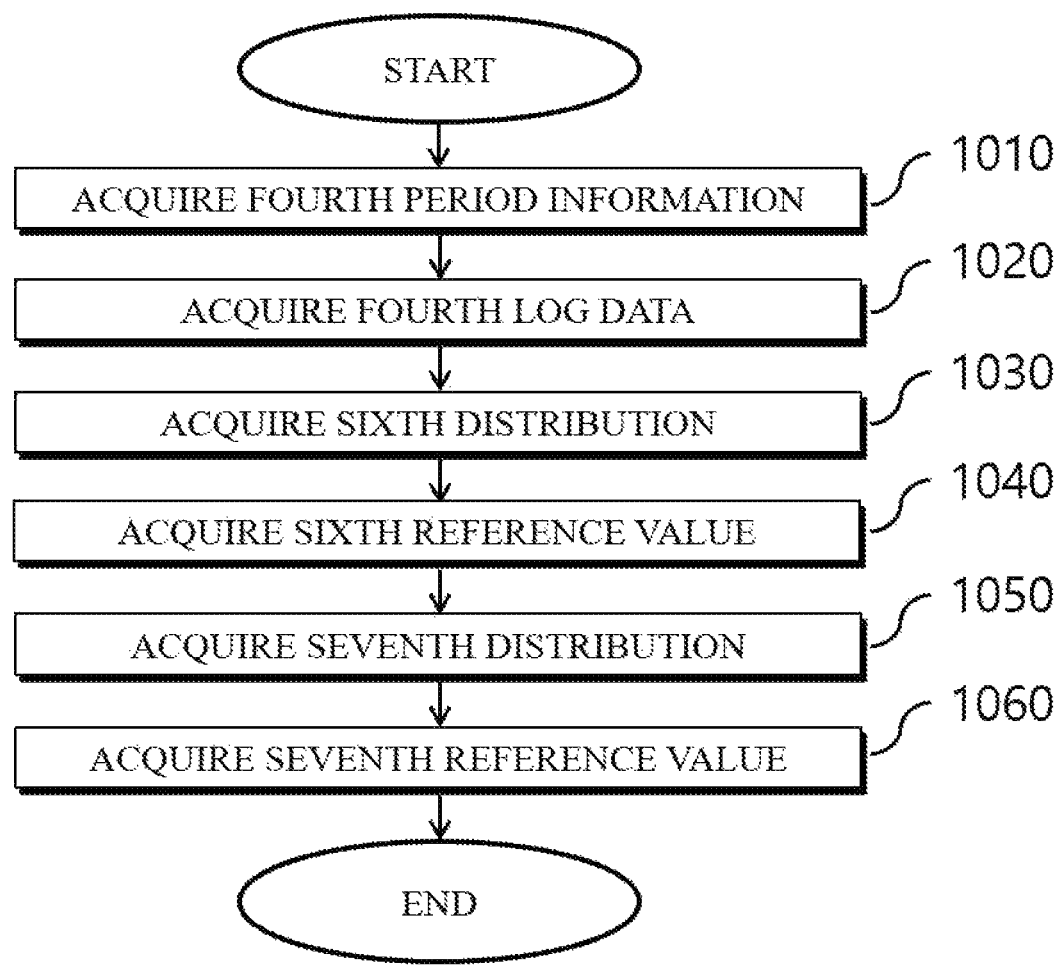
FIG. 10 is a flowchart illustrating a process of generating reference data of a fourth model according to an embodiment of the present disclosure.

FIG. 10 is a flowchart illustrating a process of generating reference data of a fourth model according to an embodiment of the present disclosure.

The fourth model is a psychological model for distinguishing a user who does not play daily limited content much but has a high task accomplishment rate. Daily limited content indicates content that is usable only a determined number of times per day, updated once per day, or reset once per day. A task is a goal provided to a user by the game service and may be accomplished when the user does a specific activity in the game. When the user accomplishes a task, the user may acquire a paid item. A user who does not play daily limited content much but has a high task accomplishment rate may be a user who mainly plays tasks. Since only a limited number of tasks are provided in the game, the user who does not play daily limited content much but has a high task accomplishment rate may quit the game because there are no more avenues of entertainment. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring fourth period information from the setup information (1010). The fourth period information may indicate a period of time in which log data required for applying the fourth model is collected. Referring to FIG. 4, the fourth period information may correspond to the analysis period 440.

The server 100 may perform the operation of generating reference data (230). The server 100 may perform an operation of acquiring fourth log data corresponding to the fourth period information from the raw database (1020). The fourth log data may be included in the test database output by the test data acquirer 350.

The server 100 may perform an operation of acquiring a sixth distribution of users on a first axis, which represents a time in which a user uses first content, on the basis of the fourth log data (1030). The server 100 may acquire a time in which a user uses the first content on the basis of log data of a plurality of users included in the fourth log data. Here, the first content may indicate daily limited content.

Also, the server 100 may perform an operation of acquiring a sixth reference value included in reference data on the basis of the sixth distribution (1040). Referring to FIGS. 6 and 7, the horizontal axis 610 may denote a use time of the first content on the basis of log data of a user. The horizontal axis 610 may correspond to the first axis. The vertical axis 620 may denote the number of users corresponding to the time in which the user uses the first content. The server 100 may acquire the sixth distribution on the basis of the fourth log data. The sixth distribution may be shown as the graph 630. The server 100 may determine the sixth reference value on the basis of the sixth distribution. The sixth reference value may be a value for determining whether a time in which a user uses the first content is long or short. A process of determining a reference value on the basis of distribution has already been described with reference to FIGS. 6 and 7, and thus the description thereof is not reiterated.

The server 100 may perform an operation of acquiring a seventh distribution of users on a second axis, which represents a time in which the user uses second content, on the basis of the fourth log data (1050). The server 100 may acquire a time in which a user uses the second content on the basis of the log data of the plurality of users included in the fourth log data. Here, the second content may indicate task content. The second axis may be described in the same way as the first axis which has already been described.

Also, the server 100 may perform an operation of acquiring a seventh reference value included in reference data on the basis of the seventh distribution (1060).

Referring to FIGS. 6 and 7, the horizontal axis 610 may denote a time in which a user uses the second content on the basis of log data of the user. The horizontal axis 610 may correspond to the second axis. The vertical axis 620 may denote the number of users corresponding to the time in which the user uses the second content.

The server 100 may acquire the seventh distribution on the basis of the fourth log data. The seventh distribution may be shown as the graph 630. The server 100 may determine the seventh reference value on the basis of the seventh distribution. The seventh reference value may be a value for determining whether a time in which a user uses the second content is long or short. A process of determining a reference value on the basis of distribution has already been described with reference to FIGS. 6 and 7, and thus the description thereof is not reiterated.

The server 100 may perform the operation of acquiring psychological state information of a user to be analyzed using the sixth reference value and the seventh reference value (240). For example, when a time in which the user to be analyzed uses the first content is smaller than the sixth reference value and a time in which the user to be analyzed uses the second content is larger than the seventh reference value, the server 100 may determine a psychological state of the user to be analyzed as being highly likely to quit the game. The server 100 may output an analysis result. The user or the server 100 may take action according to the analysis result.

Figure 11:
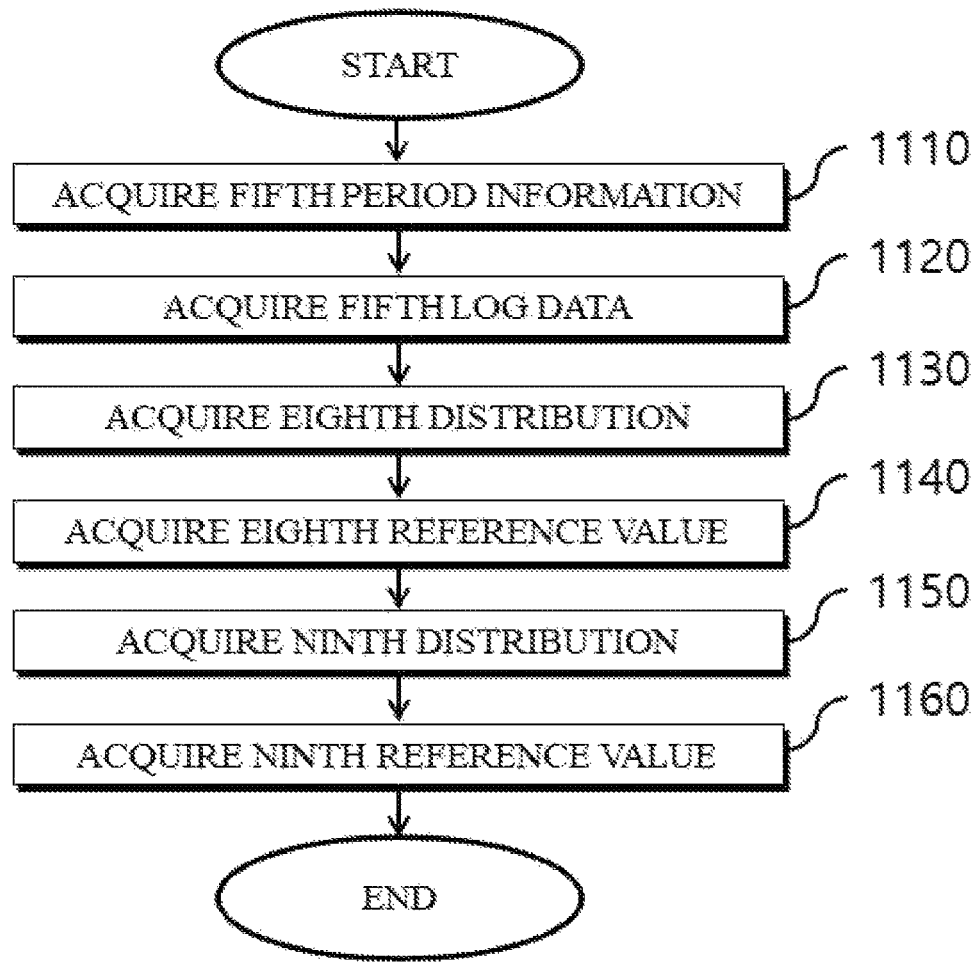
FIG. 11 is a flowchart illustrating a process of generating reference data of a fifth model according to an embodiment of the present disclosure.

FIG. 11 is a flowchart illustrating a process of generating reference data of a fifth model according to an embodiment of the present disclosure.

The fifth model is a psychological model for distinguishing a user who rapidly accomplishes story content. Story content indicates content which enables a user to enjoy a story in the game service. When a user fails while rapidly proceeding with story content, the user may think that the game service provider induces payment and thus may stop using the game. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring fifth period information from the setup information (1110). The fifth period information may indicate a period of time in which log data required for applying the fifth model is collected. Referring to FIG. 4, the fifth period information may correspond to the analysis period 440.

The server 100 may perform the operation of generating reference data (230). The server 100 may perform an operation of acquiring fifth log data corresponding to the fifth period information from the raw database (1120). The fifth log data may be included in the test database output by the test data acquirer 350.

The server 100 may perform an operation of acquiring an eighth distribution of users on a first axis, which represents the number of times a user has paid a billed amount, on the basis of the fifth log data (1130). The server 100 may acquire the number of times a user has paid a billed amount on the basis of log data of a plurality of users included in the fifth log data. Here, the billing refers to a game service provider charging a user a fee in return for providing the game service. A user may pay a billed amount to use an item that enhances character performance, a character, or an item that changes the appearance of a character. Also, a user may regularly pay a billed amount to use the game service or to more conveniently use the game service.

Also, the server 100 may perform an operation of acquiring an eighth reference value included in reference data on the basis of the eighth distribution (1140). Referring to FIGS. 6 and 7, the horizontal axis 610 may denote the number of times a user has paid a billed amount on the basis of log data of the user. The horizontal axis 610 may correspond to the first axis. The vertical axis 620 may denote the number of users corresponding to the number of times the user has paid a billed amount. The server 100 may acquire the eighth distribution on the basis of the fifth log data. The eighth distribution may be shown as the graph 630. The server 100 may determine the eighth reference value on the basis of the eighth distribution. The eighth reference value may be a value for determining whether the number of times a user has paid a billed amount is large or small. A process of determining a reference value on the basis of distribution has already been described with reference to FIGS. 6 and 7, and thus the description thereof is not reiterated.

The server 100 may perform an operation of acquiring a ninth distribution of users on a second axis, which represents the number of times a user has failed while playing first content, on the basis of the fifth log data (1150). The server 100 may acquire the number of times a user has failed while playing first content on the basis of the log data of the plurality of users included in the fifth log data. Here, the first content may indicate story content. Also, the server 100 may acquire the number of times a user has failed while attempting the first content during a predetermined period of time included in a fifth period. The server 100 may determine the predetermined period of time on the basis of the setup information.

Also, the server 100 may perform an operation of acquiring a ninth reference value included in reference data on the basis of the ninth distribution (1160). Referring to FIGS. 6 and 7, the horizontal axis 610 may denote the number of times a user has failed while playing the first content on the basis of log data of the user. The horizontal axis 610 may correspond to the second axis. The vertical axis 620 may denote the number of users corresponding to the number of times the user has failed while playing the first content.

The server 100 may acquire the ninth distribution on the basis of the fifth log data. The ninth distribution may be shown as the graph 630. The server 100 may determine the ninth reference value on the basis of the ninth distribution. The ninth reference value may be a value for determining whether a user's number of failures is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the eighth reference value and the ninth reference value (240). For example, when the number of times the user to be analyzed has paid a billed amount is smaller than the eighth reference value and the number of times the user to be analyzed has failed while playing the first content is larger than the ninth reference value, the server 100 may determine a psychological state of the user to be analyzed as being highly likely to quit the game. The server 100 may output an analysis result. The user or the server 100 may take action according to the analysis result.

Figure 12:
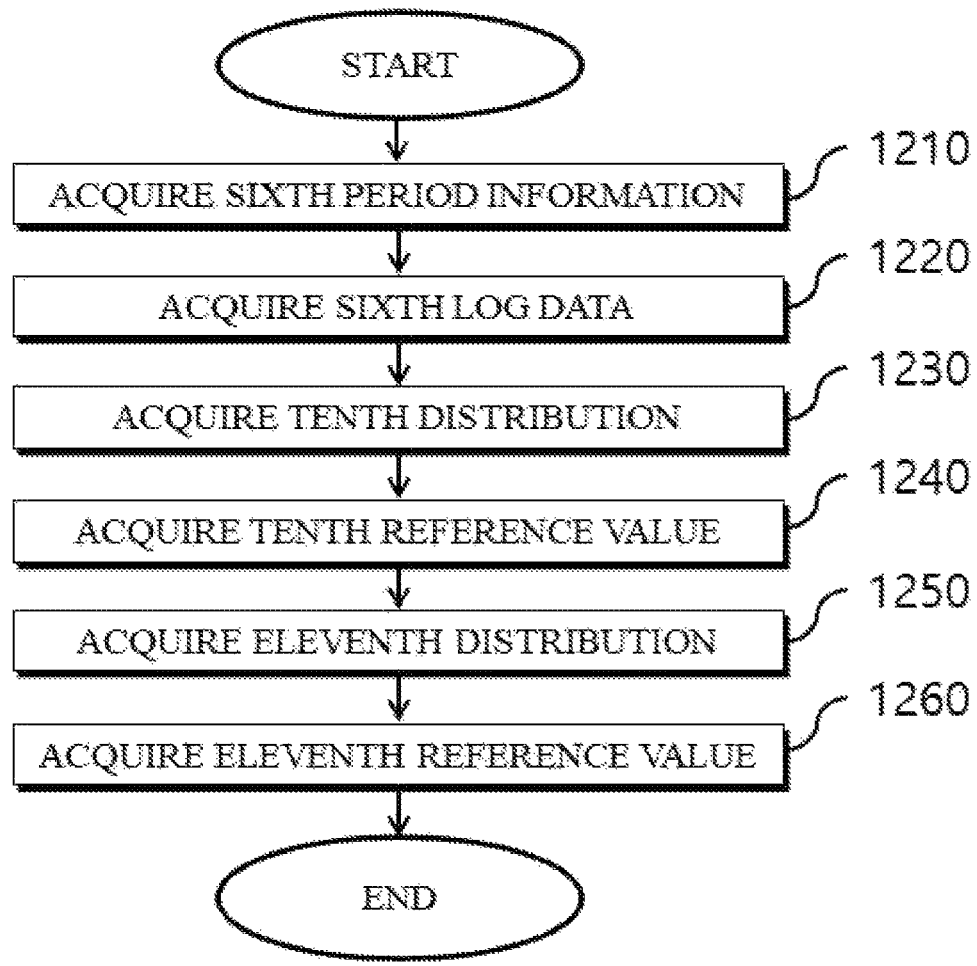
FIG. 12 is a flowchart illustrating a process of generating reference data of a sixth model according to an embodiment of the present disclosure.

FIG. 12 is a flowchart illustrating a process of generating reference data of a sixth model according to an embodiment of the present disclosure.

The sixth model is a psychological model for distinguishing a user who has paid a lot of money for the game but has not developed a character compared to the paid amount. When a growth rate of a user's character is not high despite a great deal of money being paid for the game service, the user may not enjoy the game much. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring sixth period information from the setup information (1210). The sixth period information may indicate a period of time in which log data required for applying the sixth model is collected. Referring to FIG. 4, the sixth period information may correspond to the analysis period 440.

The server 100 may perform the operation of generating reference data (230). The server 100 may perform an operation of acquiring sixth log data corresponding to the sixth period information from the raw database (1220). The sixth log data may be included in the test database output by the test data acquirer 350.

The server 100 may perform an operation of acquiring a tenth distribution of users on a first axis, which represents efficiency information acquired on the basis of a total play time and character level information, on the basis of the sixth log data (1230). The server 100 may acquire total play times and character level information on the basis of log data of a plurality of users included in the sixth log data. Here, the efficiency information may be information related to character level information per total play time. That is, the efficiency information may have a value proportional to the character level information per total play time.

Also, the server 100 may perform an operation of acquiring a tenth reference value included in reference data on the basis of the tenth distribution (1240). Referring to FIGS. 6 and 7, the horizontal axis 610 may denote efficiency information on the basis of log data of a user. The horizontal axis 610 may correspond to the first axis. The vertical axis 620 may denote the number of users corresponding to the efficiency information. The server 100 may acquire the tenth distribution on the basis of the sixth log data. The tenth distribution may be shown as the graph 630. The server 100 may determine the tenth reference value on the basis of the tenth distribution. The tenth reference value may be a value for determining whether efficiency information is high or low. A process of determining a reference value on the basis of distribution has already been described with reference to FIGS. 6 and 7, and thus the description thereof is not reiterated.

The server 100 may perform an operation of acquiring an eleventh distribution of users on a second axis, which represents a billed amount for a user, on the basis of the sixth log data (1250). The server 100 may acquire a billed amount for a user on the basis of the log data of the plurality of users included in the sixth log data. A billed amount for a user may indicate an amount paid by the user for the game service for a predetermined period of time. The server 100 may acquire the predetermined period of time on the basis of the setup information.

Also, the server 100 may perform an operation of acquiring an eleventh reference value included in reference data on the basis of the eleventh distribution (1260). Referring to FIGS. 6 and 7, the horizontal axis 610 may denote a billed amount for a user on the basis of log data of the user. The horizontal axis 610 may correspond to the second axis. The vertical axis 620 may denote the number of users corresponding to the billed amount for the user.

The server 100 may acquire the eleventh distribution on the basis of the sixth log data. The eleventh distribution may be shown as the graph 630. The server 100 may determine the eleventh reference value on the basis of the eleventh distribution. The eleventh reference value may be a value for determining whether an amount paid by a user is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the tenth reference value and the eleventh reference value (240). For example, when efficiency information of the user to be analyzed is lower than the tenth reference value and an amount paid by the user to be analyzed for the game service is larger than the eleventh reference value, the server 100 may determine a psychological state of the user to be analyzed as being highly likely to quit the game. The server 100 may output an analysis result. The user or the server 100 may take action according to the analysis result.

Figure 13:
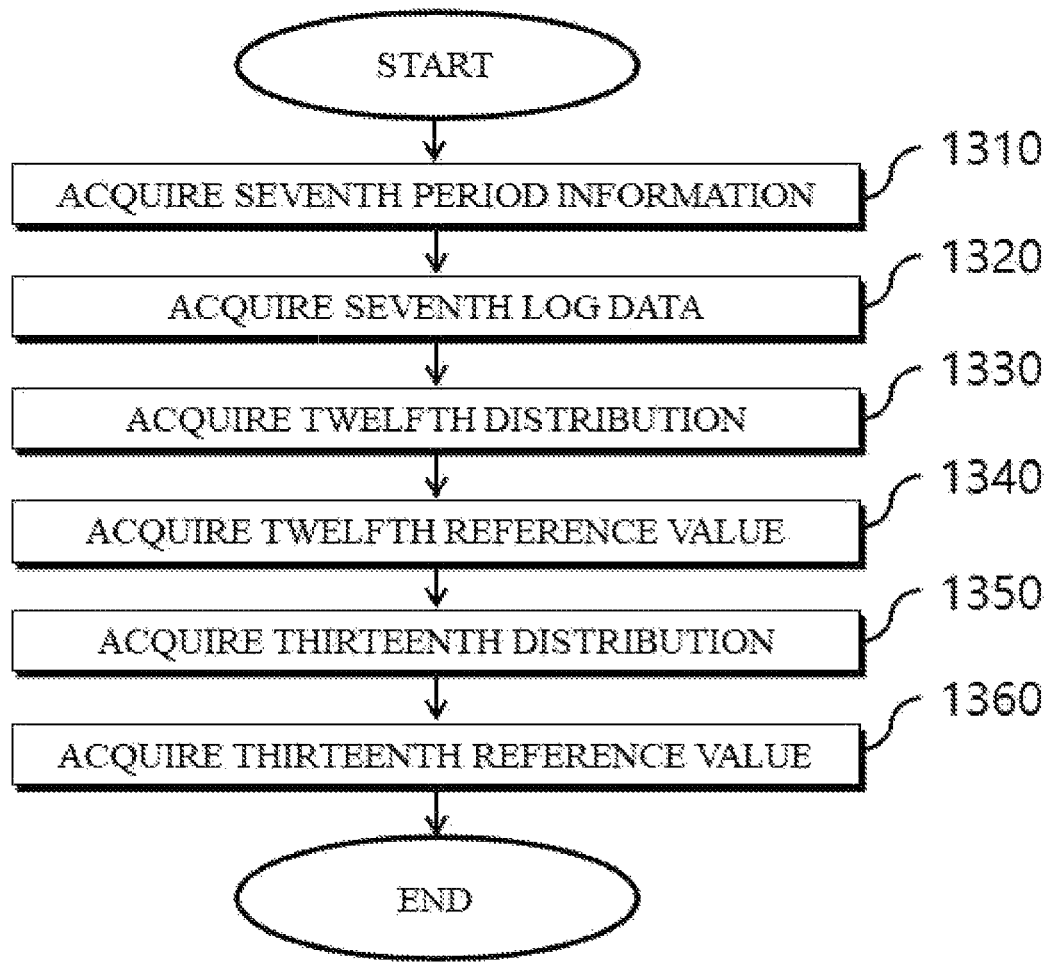
FIG. 13 is a flowchart illustrating a process of generating reference data of a seventh model according to an embodiment of the present disclosure.

FIG. 13 is a flowchart illustrating a process of generating reference data of a seventh model according to an embodiment of the present disclosure.

The seventh model is a psychological model for distinguishing a user who frequently uses a character related to a first character. A character related to the first character may indicate a character related to the first character in a story or a character who significantly increases team performance when teamed with the first character. For example, when a related character and a first character are teamed up, at least one of attack power, defense power, and agility of the team may be increased. When a user uses a first character and a related character together for a predetermined period of time or more, the server 100 may determine the user as a user who prefers the first character. Such a user may use a great deal of online money for the first character. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring seventh period information from the setup information (1310). The seventh period information may indicate a period of time in which log data required for applying the seventh model is collected. Referring to FIG. 4, the seventh period information may correspond to the analysis period 440.

The server 100 may perform the operation of generating reference data (230). The server 100 may perform an operation of acquiring seventh log data corresponding to the seventh period information from the raw database (1320). The seventh log data may be included in the test database output by the test data acquirer 350.

The server 100 may perform an operation of acquiring a twelfth distribution of users on a first axis, which represents a ratio of using a character related to a first character among characters used by a user for a first sub-period included in a seventh period, on the basis of the seventh log data (1330).

The server 100 may acquire the first-sub period on the basis of the setup information. The server 100 may acquire the first sub-period included in the setup information from the memory. The first sub-period may include start point information and end point information. Also, the first sub-period may include the start point information and period information.

The ratio of using a character related to a first character may indicate a ratio of the number of times a user has played the game by selecting the first character and a character related to the first character to the total number of times the user has played the game by selecting a character.

The server 100 may acquire the total number of times a user has played the game by selecting a character for the first sub-period and the number of times the user has played the game by selecting a first character and a character related to the first character on the basis of log data of a plurality of users included in the seventh log data. The server 100 may calculate the ratio of using a character related to the first character among characters used by the user for the first sub-period.

Also, the server 100 may perform an operation of acquiring a twelfth reference value included in reference data on the basis of the twelfth distribution (1340). Referring to FIGS. 6 and 7, the horizontal axis 610 may denote a ratio of using a character related to a first character among characters used by a user for the first sub-period on the basis of log data of a user. The horizontal axis 610 may correspond to the first axis. The vertical axis 620 may denote the number of users corresponding to the ratio. The server 100 may acquire the twelfth distribution on the basis of the seventh log data. The twelfth distribution may be shown as the graph 630. The server 100 may determine the twelfth reference value on the basis of the twelfth distribution. The twelfth reference value may be a value for determining whether the ratio of using a character related to a first character for the first sub-period is high or low. A process of determining a reference value on the basis of distribution has already been described with reference to FIGS. 6 and 7, and thus the description thereof is not reiterated.

Referring back to FIG. 13, the server 100 may perform an operation of acquiring a thirteenth distribution of users on a second axis, which represents a ratio of using a character related to the first character among characters used by the user for a second sub-period included in the seventh period after the first sub-period, on the basis of the seventh log data (1350).

The server 100 may acquire the second sub-period on the basis of the setup information. The server 100 may acquire the second sub-period included in the setup information from the memory. The second sub-period may be subsequent to the first sub-period. The second sub-period may include start point information and end point information. Also, the second sub-period may include the start point information and period information. In the second sub-period, the start point information may be replaced with the end point information of the first sub-period.

The server 100 may acquire the total number of times the user has played the game by selecting a character for the second sub-period and the number of times the user has played the game by selecting a first character and a character related to the first character on the basis of the log data of the plurality of users included in the seventh log data. The server 100 may calculate a ratio of using a character related to the first character among characters used by the user for the second sub-period.

Also, the server 100 may perform an operation of acquiring a thirteenth reference value included in reference data on the basis of the thirteenth distribution (1360). Referring to FIGS. 6 and 7, the horizontal axis 610 may denote a ratio of using a character related to a first character among characters used by a user for a second sub-period on the basis of log data of the user. The horizontal axis 610 may correspond to the second axis. The vertical axis 620 may denote the number of users corresponding to the ratio of using a character related to the first character among the characters used by the user for the second sub-period.

The server 100 may acquire the thirteenth distribution on the basis of the seventh log data. The thirteenth distribution may be shown as the graph 630. The server 100 may determine the thirteenth reference value on the basis of the thirteenth distribution. The thirteenth reference value may be a value for determining whether a ratio of using a character related to a first character among characters used by a user for a second sub-period is high or low. A process of determining a reference value on the basis of distribution has already been described with reference to FIGS. 6 and 7, and thus the description thereof is not reiterated.

The server 100 may perform the operation of acquiring psychological state information of a user to be analyzed using the twelfth reference value and the thirteenth reference value (240). For example, when a ratio of using a character related to a first character by a user to be analyzed for a first sub-period is lower than the twelfth reference value and a ratio of using a character related to a first character by the user for a second sub-period is higher than the thirteenth reference value, the server 100 may determine a psychological state of the user to be analyzed as being likely to use a great deal of online money for the first character. The server 100 may output an analysis result. The user or the server 100 may take action according to the analysis result.

Figure 14:
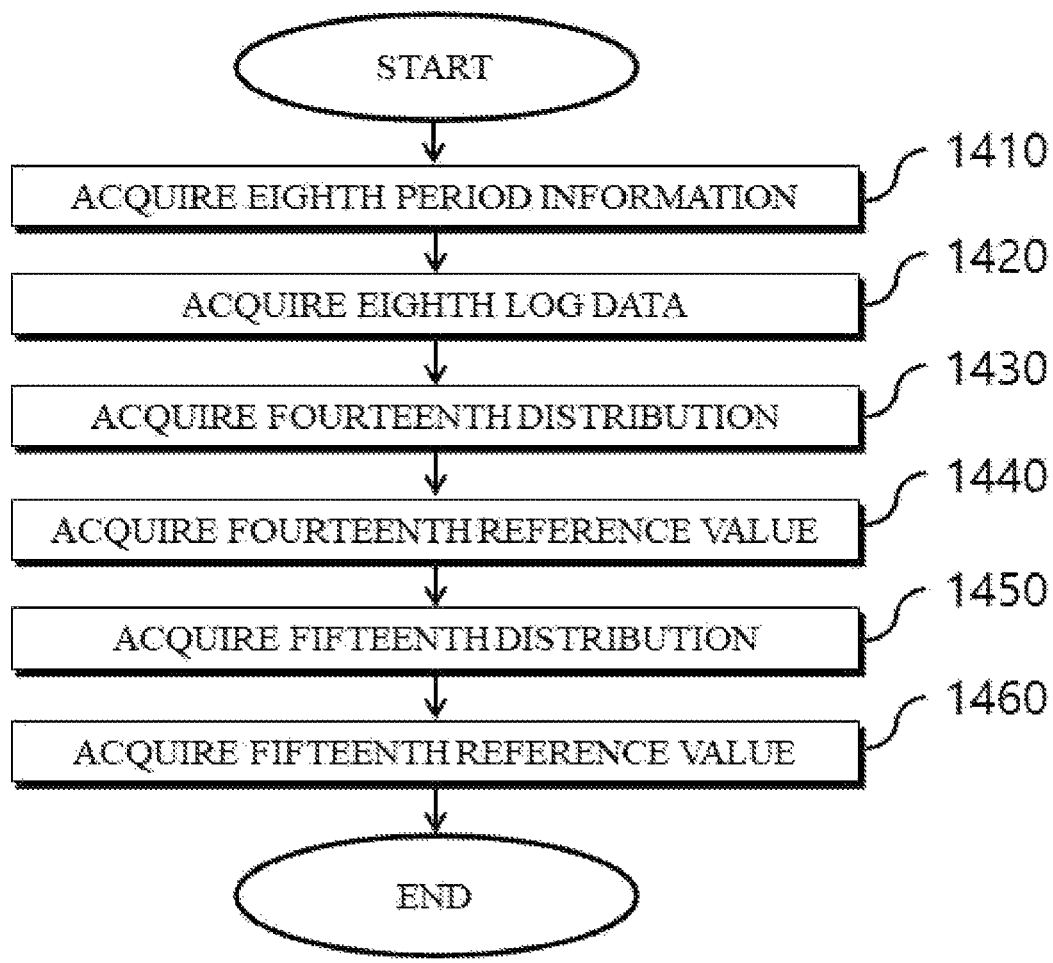
FIG. 14 is a flowchart illustrating a process of generating reference data of an eighth model according to an embodiment of the present disclosure.

FIG. 14 is a flowchart illustrating a process of generating reference data of an eighth model according to an embodiment of the present disclosure.

The eighth model is a psychological model for distinguishing a user who has used many types of characters and acquired many types of character development items. When a user uses many types of characters and the characters have similar levels, the server 100 may determine a psychological state of the user as being likely to use the game for a long time because the user is enjoying the game. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring eighth period information from the setup information (1410). The eighth period information may indicate a period of time in which log data required for applying the eighth model is collected. Referring to FIG. 4, the eighth period information may correspond to the analysis period 440.

The server 100 may perform the operation of generating reference data (230). The server 100 may perform an operation of acquiring eighth log data corresponding to the eighth period information from the raw database (1420). The eighth log data may be included in the test database output by the test data acquirer 350.

The server 100 may perform an operation of acquiring a fourteenth distribution of users on a first axis, which represents the number of types of characters used by a user, on the basis of the eighth log data (1430).

Also, the server 100 may perform an operation of acquiring a fourteenth reference value included in reference data on the basis of the fourteenth distribution (1440). Referring to FIGS. 6 and 7, the horizontal axis 610 may denote the number of types of characters used by a user on the basis of log data of the user. The horizontal axis 610 may correspond to the first axis. The vertical axis 620 may denote the number of users corresponding to the number of types of characters used by the user. The server 100 may acquire the fourteenth distribution on the basis of the eighth log data. The fourteenth distribution may be shown as the graph 630. The server 100 may determine the fourteenth reference value on the basis of the fourteenth distribution. The fourteenth reference value may be a value for determining whether the number of types of characters used by a user is large or small. A process of determining a reference value on the basis of distribution has already been described with reference to FIGS. 6 and 7, and thus the description thereof is not reiterated.

Referring back to FIG. 14, the server 100 may perform an operation of acquiring a fifteenth distribution of users on a second axis, which represents the number of types of character development items acquired by a user, on the basis of the eighth log data (1450).

The server 100 may acquire information on character development items acquired by a user on the basis of the log data of a plurality of users included in the eighth log data. The server 100 may calculate the number of types of character development items acquired by a user.

Also, the server 100 may perform an operation of acquiring a fifteenth reference value included in reference data on the basis of the fifteenth distribution (1460). Referring to FIGS. 6 and 7, the horizontal axis 610 may denote the number of types of character development items acquired by a user on the basis of log data of the user. The horizontal axis 610 may correspond to the second axis. The vertical axis 620 may denote the number of users corresponding to the number of types of character development items acquired by the user.

The server 100 may acquire the fifteenth distribution on the basis of the eighth log data. The fifteenth distribution may be shown as the graph 630. The server 100 may determine the fifteenth reference value on the basis of the fifteenth distribution. The fifteenth reference value may be a value for determining whether the number of types of character development items acquired by a user is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the fourteenth reference value and the fifteenth reference value (240). For example, when the number of types of characters used by the user to be analyzed is larger than the fourteenth reference value and the number of types of character development items acquired by the user is larger than the fifteenth reference value, the server 100 may determine a psychological state of the user to be analyzed as being likely to use the game for a long time because the user is enjoying the game. The server 100 may output an analysis result. The user or the server 100 may take action according to the analysis result.

According to another embodiment of the present disclosure, the server 100 may acquire a standard deviation of levels of characters used by a user on the basis of log data of the user. Also, the server 100 may determine, as the fifteenth reference value, the standard deviation of level of characters used by the user on the basis of the log data of the user. Also, the server 100 may acquire psychological state information of a user to be analyzed. When the number of types of characters used by the user is larger than the fourteenth reference value and a standard deviation of levels of characters used by the user is smaller than the fifteenth reference value, the server 100 may determine a psychological state of the user to be analyzed as being likely to use the game service for a long time because the user is enjoying the game.

Figure 15:
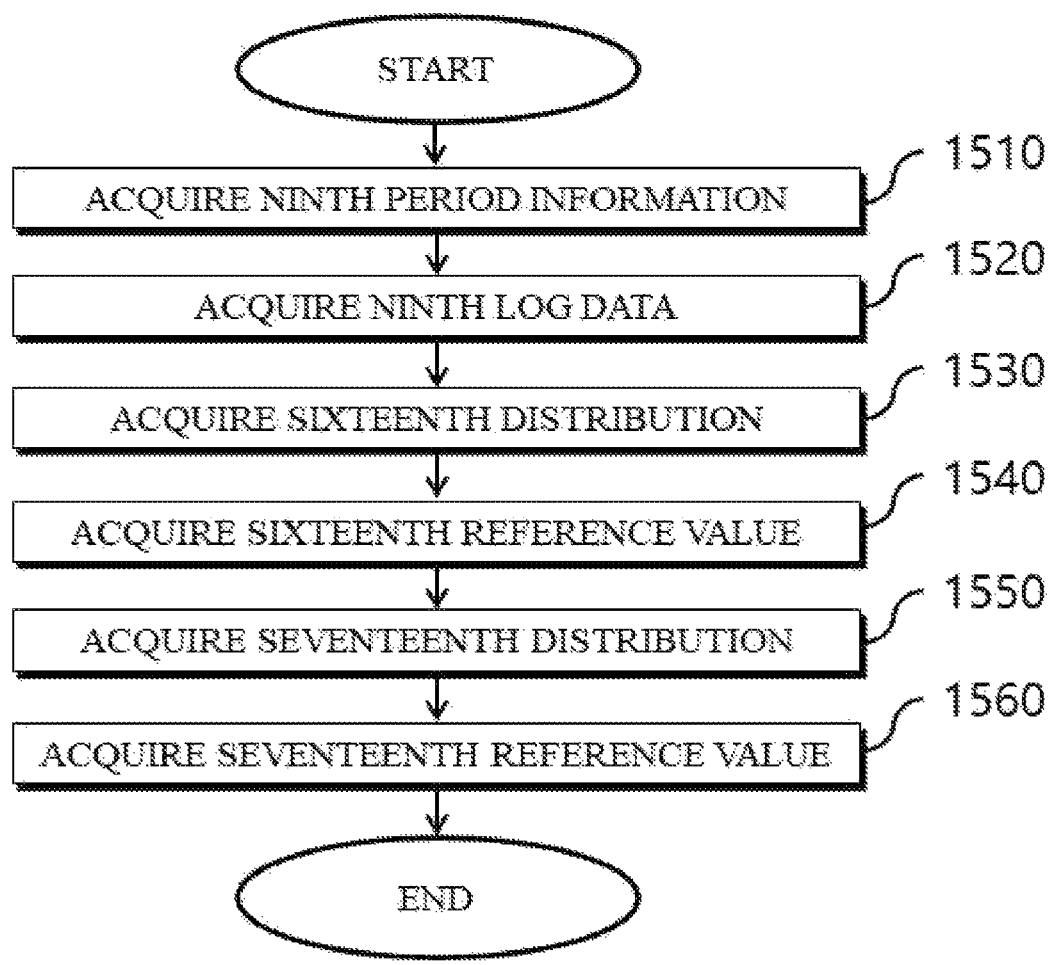
FIG. 15 is a flowchart illustrating a process of generating reference data of a ninth model according to an embodiment of the present disclosure.

FIG. 15 is a flowchart illustrating a process of generating reference data of a ninth model according to an embodiment of the present disclosure.

The ninth model is a psychological model for distinguishing a user who has irregular play times. When a user has irregular play times, the server 100 may determine a psychological state of the user as not being likely to continuously use the game because the user's daily life is irregular. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring ninth period information from the setup information (1510). The ninth period information may indicate a period of time in which log data required for applying the ninth model is collected. Referring to FIG. 4, the ninth period information may correspond to the analysis period 440.

The server 100 may perform the operation of generating reference data (230). The server 100 may perform an operation of acquiring ninth log data corresponding to the ninth period information from the raw database (1520). The ninth log data may be included in the test database output by the test data acquirer 350.

The server 100 may perform an operation of acquiring a sixteenth distribution of users on a first axis, which represents variability in specific-time-slot play ratios during a third sub-period included in the ninth period, on the basis of the ninth log data (1530).

The server 100 may acquire the third sub-period on the basis of the setup information. The server 100 may acquire the third sub-period included in the setup information from the memory. The third sub-period may include start point information and end point information. Also, the third sub-period may include start point information and period information.

The server 100 may acquire the number of times a user has played the game in a specific time slot during the third sub-period from the ninth log data. The specific time slot may be a commute time, a weekend time, or a weekday time. The server 100 may acquire the total number of times the user has played the game from the ninth log data. The server 100 may acquire a ratio value obtained by dividing the number of times the user has played the game in a specific time slot by the total number of times the user has played the game. The server 100 may determine, as variability, a value obtained by dividing a standard deviation of ratio values by an average of the ratio values. In other words, the server 100 may acquire variability on the basis of Equation 1 below.

Variability in specific-time-slot play ratios=Standard deviation(number of play times in specific time slot/total number of play times)/Average(number of play times in specific time slot/total number of play times)      Equation 1.

Also, the server 100 may perform an operation of acquiring a sixteenth reference value included in reference data on the basis of the sixteenth distribution (1540). Referring to FIGS. 6 and 7, the horizontal axis 610 may denote variability in specific-time-slot play ratios during the third sub-period on the basis of log data of a user. The horizontal axis 610 may correspond to the first axis. The vertical axis 620 may denote the number of users corresponding to the variability in specific-time-slot play ratios during the third sub-period. The server 100 may acquire the sixteenth distribution on the basis of the ninth log data. The sixteenth distribution may be shown as the graph 630. The server 100 may determine the sixteenth reference value on the basis of the sixteenth distribution. The sixteenth reference value may be a value for determining whether variability in specific-time-slot play ratios during the third sub-period is high or low. A process of determining a reference value on the basis of distribution has already been described with reference to FIGS. 6 and 7, and thus the description thereof is not reiterated.

Referring back to FIG. 15, the server 100 may perform an operation of acquiring a seventeenth distribution of users on a second axis, which represents variability in specific-time-slot play ratios during a fourth sub-period included in the ninth period after the third sub-period, on the basis of the ninth log data (1550).

The server 100 may acquire the fourth sub-period on the basis of the setup information. The server 100 may acquire the fourth sub-period included in the setup information from the memory. The fourth sub-period may be subsequent to the third sub-period. The fourth sub-period may include start point information and end point information. Also, the fourth sub-period may include start point information and period information. In the fourth sub-period, the start point information may be replaced by the end point information of the third sub-period.

The server 100 may acquire the number of times a user has played the game in a specific time slot during the fourth sub-period from the ninth log data. The specific time slot may be a commute time, a weekend time, or a weekday time. The server 100 may acquire the total number of times the user has played the game from the ninth log data. The server 100 may acquire a ratio value obtained by dividing the number of times the user has played the game in a specific time slot by the total number of times the user has played the game. The server 100 may determine, as variability, a value obtained by dividing a standard deviation of ratio values by an average of the ratio values. In other words, the server 100 may acquire variability on the basis of Equation 1.

Also, the server 100 may perform an operation of acquiring a seventeenth reference value included in reference data on the basis of the seventeenth distribution (1560). Referring to FIGS. 6 and 7, the horizontal axis 610 may denote variability in specific-time-slot play ratios during the fourth sub-period on the basis of log data of a user. The horizontal axis 610 may correspond to the second axis. The vertical axis 620 may denote the number of users corresponding to the variability in specific-time-slot play ratios during the fourth sub-period.

The server 100 may acquire the seventeenth distribution on the basis of the ninth log data. The seventeenth distribution may be shown as the graph 630. The server 100 may determine the seventeenth reference value on the basis of the seventeenth distribution. The seventeenth reference value may be a value for determining whether variability in specific-time-slot play ratios during the fourth sub-period is high or low. A process of determining a reference value on the basis of distribution has already been described with reference to FIGS. 6 and 7, and thus the description thereof is not reiterated.

The server 100 may perform the operation of acquiring psychological state information of a user to be analyzed using the sixteenth reference value and the seventeenth reference value (240). For example, when variability in specific-time-slot play ratios of the user to be analyzed during the third sub-period is lower than the sixteenth reference value and variability in specific-time-slot play ratios of the user to be analyzed during the fourth sub-period is lower than the seventeenth reference value, the server 100 may determine a psychological state of the user to be analyzed as being likely to use the game for a long time because the user regularly enjoys the game. The server 100 may output an analysis result. The user or the server 100 may take action according to the analysis result.

Figure 16:
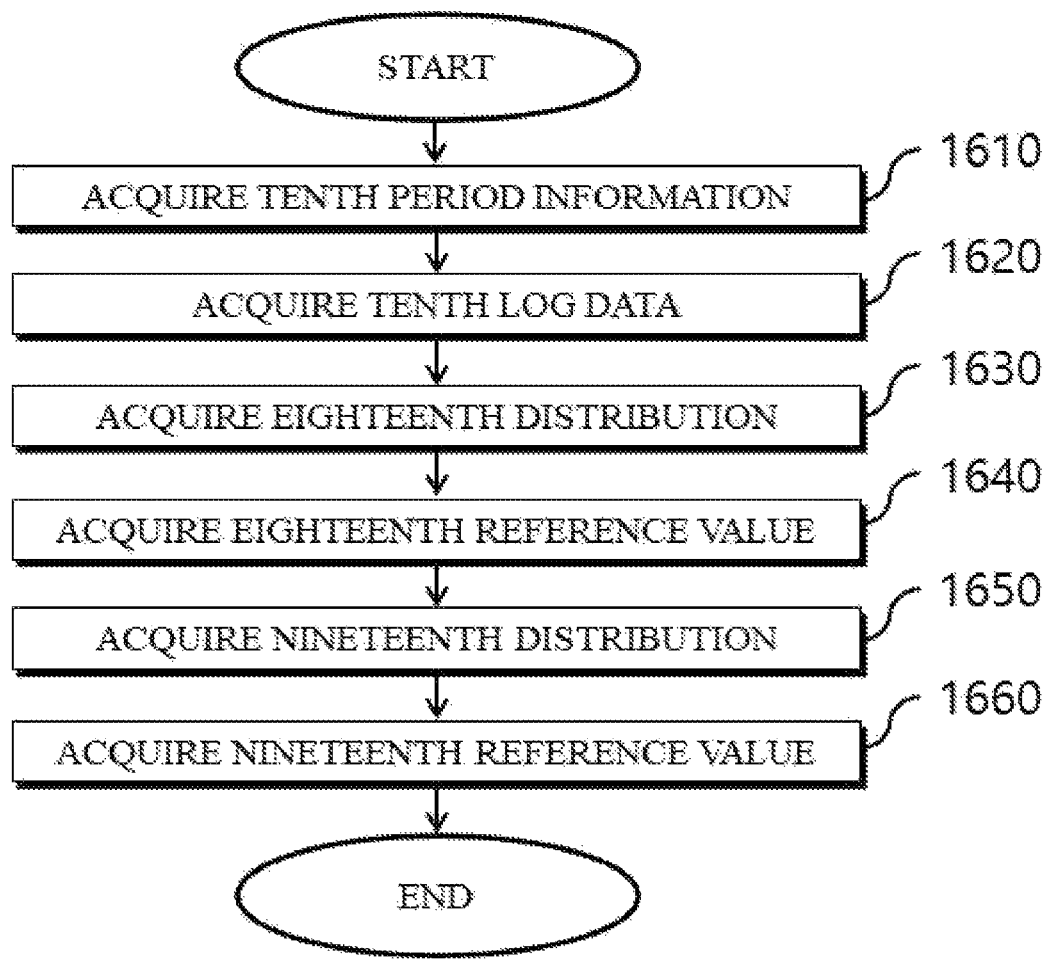
FIG. 16 is a flowchart illustrating a process of generating reference data of a tenth model according to an embodiment of the present disclosure.

FIG. 16 is a flowchart illustrating a process of generating reference data of a tenth model according to an embodiment of the present disclosure.

The tenth model is a psychological model for distinguishing a user who plays a game for a long time in an early stage after signing up for a game service but shows low effectiveness compared to the time invested for the game. When a user plays a game enthusiastically in an early stage but shows low effectiveness, the server 100 may determine a psychological state of the user as being likely to be tired of the game soon. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring tenth period information from the setup information (1610). The tenth period information may indicate a period of time in which log data required for applying the tenth model is collected. Referring to FIG. 4, the tenth period information may correspond to the analysis period 440.

The server 100 may perform the operation of generating reference data (230). The server 100 may perform an operation of acquiring tenth log data corresponding to the tenth period information from the raw database (1620). The tenth log data may be included in the test database output by the test data acquirer 350.

The server 100 may perform an operation of acquiring an eighteenth distribution of users on a first axis, which represents information related to a play time during a predetermined period of time, on the basis of the tenth log data (1630).

The server 100 may acquire the predetermined period of time on the basis of the setup information. The predetermined period of time may be one day, one week, two weeks, four weeks, one month, one year, or the like. The server 100 may acquire information related to a play time of a user during the predetermined period of time from the tenth log data. The predetermined period of time may have a game service sign-up date of the user as a start point. The predetermined period of time may be included in the tenth period information.

Also, the server 100 may perform an operation of acquiring an eighteenth reference value included in reference data on the basis of the eighteenth distribution (1640). Referring to FIGS. 6 and 7, the horizontal axis 610 may denote information related to a play time during the predetermined period of time on the basis of log data of a user. The horizontal axis 610 may correspond to the first axis. The vertical axis 620 may denote the number of users corresponding to the information related to a play time during the predetermined period of time. The server 100 may acquire the eighteenth distribution on the basis of the tenth log data. The eighteenth distribution may be shown as the graph 630. The server 100 may determine the eighteenth reference value on the basis of the eighteenth distribution. The eighteenth reference value may be a value for determining whether information related to a play time during the predetermined period of time is large or small. A process of determining a reference value on the basis of distribution has already been described with reference to FIGS. 6 and 7, and thus the description thereof is not reiterated.

Referring back to FIG. 16, the server 100 may perform an operation of acquiring a nineteenth distribution of users on a second axis, which represents information related to a user's item usage during the predetermined period of time, on the basis of the tenth log data (1650).

The server 100 may acquire information related to a user's item usage from the tenth log data. The information related to item usage may be proportional to the number of items used by the user. The items used by the user may be items that increase experience points or ability points of a character owned by the user.

Also, the server 100 may perform an operation of acquiring a nineteenth reference value included in reference data on the basis of the nineteenth distribution (1660). Referring to FIGS. 6 and 7, the horizontal axis 610 may denote information related to a user's item usage on the basis of log data of the user. The horizontal axis 610 may correspond to the second axis. The vertical axis 620 may denote the number of users corresponding to the information related to the user's item usage.

The server 100 may acquire the nineteenth distribution on the basis of the tenth log data. The nineteenth distribution may be shown as the graph 630. The server 100 may determine the nineteenth reference value on the basis of the nineteenth distribution. The nineteenth reference value may be a value for determining whether information related to a user's item usage is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the eighteenth reference value and the nineteenth reference value (240). For example, when information related to a play time of the user to be analyzed during the predetermined period of time is larger than the eighteenth reference value and information related to item usage of the user to be analyzed during the predetermined period of time is smaller than the nineteenth reference value, the server 100 may determine a psychological state of the user to be analyzed as being likely to be bored with the game service soon because the user does not efficiently play the game. The server 100 may output an analysis result. The user or the server 100 may take action according to the analysis result.

Figure 17:
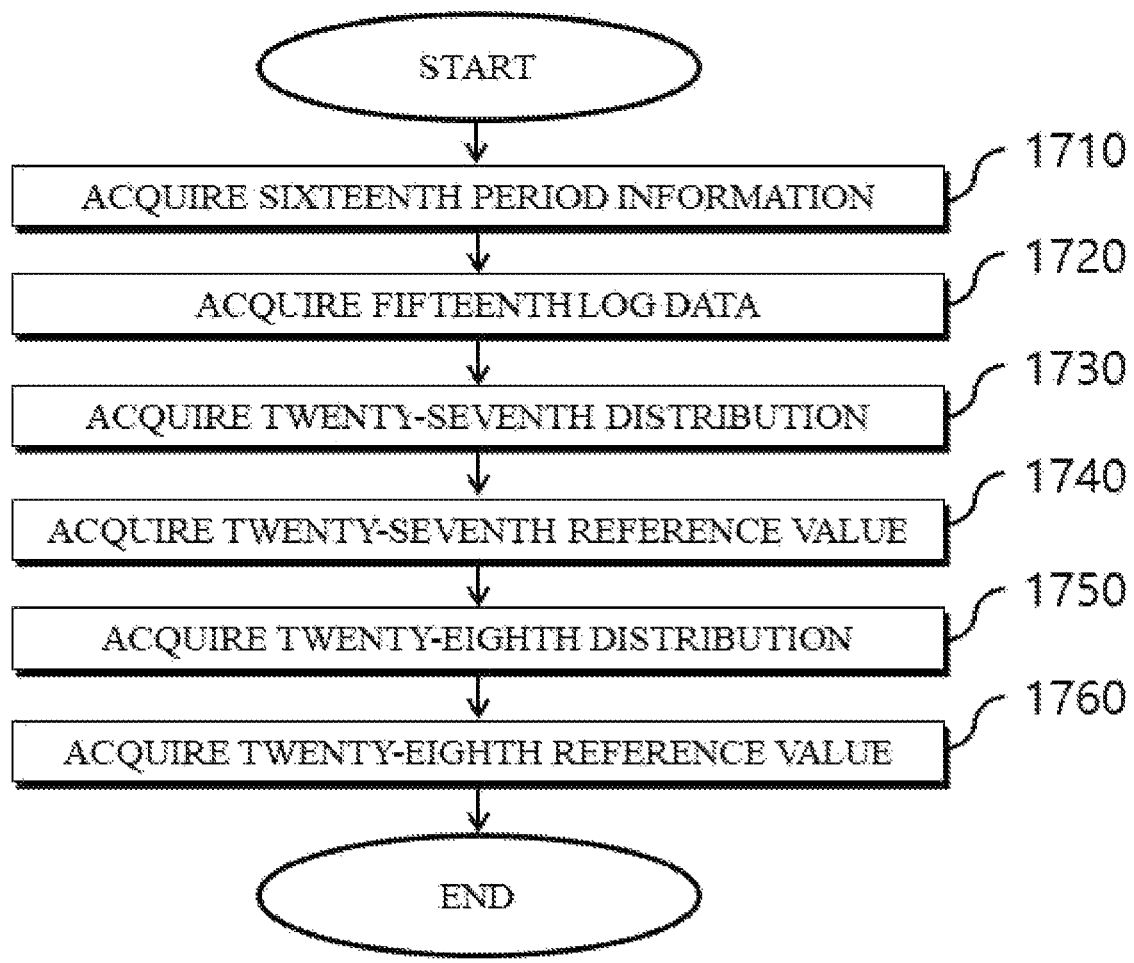
FIG. 17 is a flowchart illustrating a process of generating reference data of an eleventh model according to an embodiment of the present disclosure.

FIG. 17 is a flowchart illustrating a process of generating reference data of an eleventh model according to an embodiment of the present disclosure.

The eleventh model is a psychological model for distinguishing a user who changes an item that enhances character performance in a short period of time after a sign-up date while playing a game for a short time. An item that enhances character performance may be a rare item in a game service. A user who changes shortly rare items while playing the game for a short time means that the user puts in a great deal of effort to acquire the rare items, and the server 100 may determine a psychological state of the user as being likely to be tired of the game soon because the user does not have enough time to additionally use the game. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring sixteenth period information from the setup information (1710). The sixteenth period information may indicate a period of time in which log data required for applying the eleventh model is collected. Referring to FIG. 4, the sixteenth period information may correspond to the analysis period 440.

The server 100 may perform the operation of generating reference data (230). The server 100 may perform an operation of acquiring fifteenth log data corresponding to the sixteenth period information from the raw database (1720). The fifteenth log data may be included in the test database output by the test data acquirer 350.

The server 100 may perform an operation of acquiring a twenty-seventh distribution of users on a first axis, which represents information related to a play time during a predetermined period of time, on the basis of the fifteenth log data (1730).

The server 100 may acquire the predetermined period of time on the basis of the setup information. The predetermined period of time may be one day, one week, two weeks, four weeks, one month, one year, or the like. The server 100 may acquire information related to a play time of a user during the predetermined period of time from the fifteenth log data. The predetermined period of time may have a game service sign-up date of the user as a start point. The predetermined period of time may be included in the sixteenth period information.

Also, the server 100 may perform an operation of acquiring a twenty-seventh reference value included in reference data on the basis of the twenty-seventh distribution (1740). Referring to FIGS. 6 and 7, the horizontal axis 610 may denote information related to a play time during the predetermined period of time on the basis of log data of a user. The horizontal axis 610 may correspond to the first axis. The vertical axis 620 may denote the number of users corresponding to the information related to a play time during the predetermined period of time. The server 100 may acquire the twenty-seventh distribution on the basis of the fifteenth log data. The twenty-seventh distribution may be shown as the graph 630. The server 100 may determine the twenty-seventh reference value on the basis of the twenty-seventh distribution. The twenty-seventh reference value may be a value for determining whether information related to a play time during the predetermined period of time is large or small. A process of determining a reference value on the basis of distribution has already been described with reference to FIGS. 6 and 7, and thus the description thereof is not reiterated.

Referring back to FIG. 17, the server 100 may perform an operation of acquiring a twenty-eighth distribution of users on a second axis, which represents information related to a period of time between a sign-up date and a date when an item that enhances character performance is changed, on the basis of the fifteenth log data (1750).

The server 100 may acquire a date when an item that enhances character performance is changed from the fifteenth log data. An item that enhances character performance may be an item that increases at least one of attack power, defense power, and agility of a character when equipped by a character. An item that enhances character performance is rare and thus may be acquired only when a user plays a game for a long time. The server 100 may acquire a period of time taken by a user to change items that enhance character performance by subtracting a game service sign-up date of the user from a date when an item that enhances character performance is changed.

Also, the server 100 may perform an operation of acquiring a twenty-eighth reference value included in reference data on the basis of the twenty-eighth distribution (1760). Referring to FIGS. 6 and 7, the horizontal axis 610 may denote a period of time between a sign-up date and a date when an item that enhances character performance is changed on the basis of log data of a user. The horizontal axis 610 may correspond to the second axis. The vertical axis 620 may denote the number of users corresponding to the period of time between the sign-up date and the date when an item that enhances character performance is changed.

The server 100 may acquire the twenty-eighth distribution on the basis of the fifteenth log data. The twenty-eighth distribution may be shown as the graph 630. The server 100 may determine the twenty-eighth reference value on the basis of the twenty-eighth distribution. The twenty-eighth reference value may be a value for determining whether a period of time between a sign-up date and a date when an item that enhances character performance is changed is long or short. A process of determining a reference value on the basis of distribution has already been described with reference to FIGS. 6 and 7, and thus the description thereof is not reiterated.

The server 100 may perform the operation of acquiring psychological state information of a user to be analyzed using the twenty-seventh reference value and the twenty-eighth reference value (240). For example, when information related to a play time of the user to be analyzed during the predetermined period of time is smaller than the twenty-seventh reference value and a period of time between a sign-up date of the user to be analyzed and a date when an item that enhances character performance is changed is smaller than the twenty-eighth reference value, the server 100 may determine a psychological state of the user to be analyzed as being likely to be bored with the game service soon and quit the game soon because the user makes a quick selection. The server 100 may output an analysis result. The user or the server 100 may take action according to the analysis result.

Figure 18:
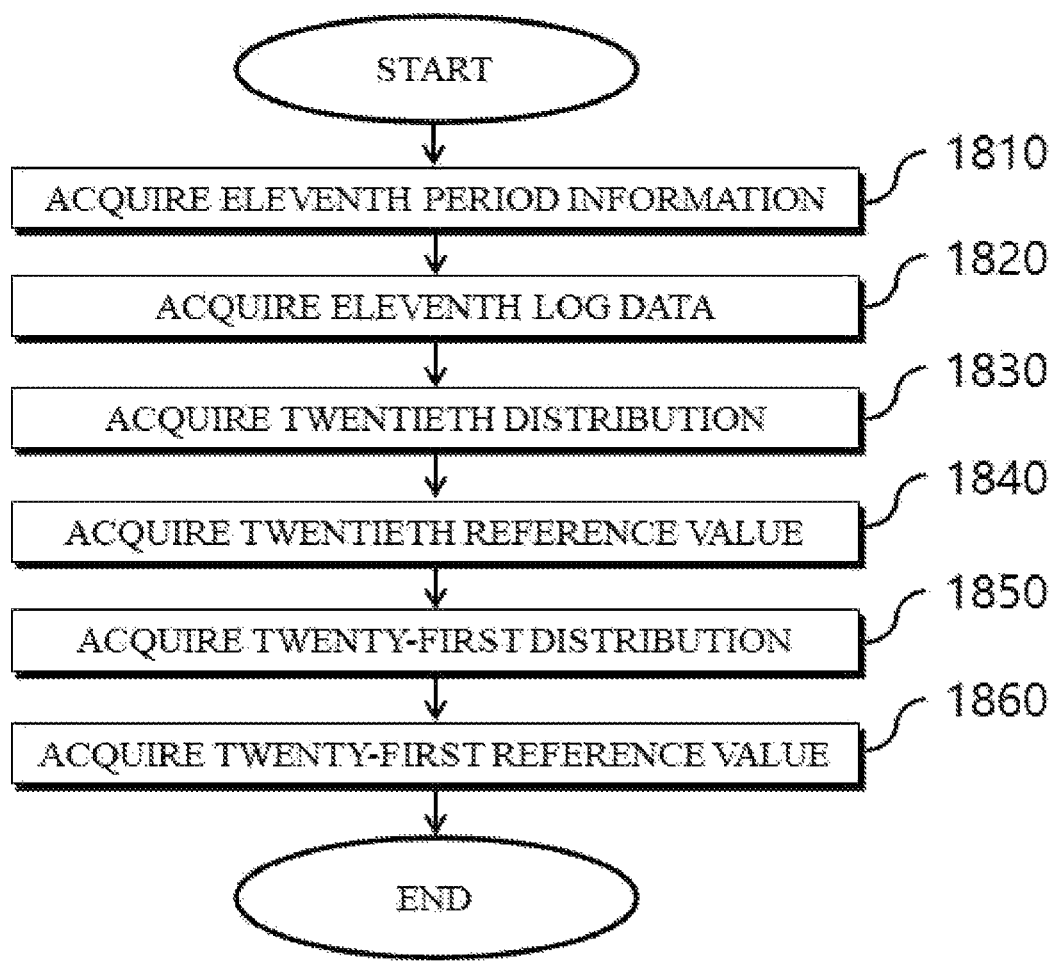
FIG. 18 is a flowchart illustrating a process of generating reference data of a twelfth model according to an embodiment of the present disclosure.

FIG. 18 is a flowchart illustrating a process of generating reference data of a twelfth model according to an embodiment of the present disclosure.

The twelfth model is a psychological model for distinguishing a user who rapidly proceeds through story content. When a user rapidly proceeds through story content, the server 100 may determine a psychological state of the user as being likely to be tired of the game service when progression is stopped because the user firmly pursues fun versus exerted effort. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring eleventh period information from the setup information (1810). The eleventh period information may indicate a period of time in which log data required for applying the twelfth model is collected. Referring to FIG. 4, the eleventh period information may correspond to the analysis period 440.

The server 100 may perform the operation of generating reference data (230). The server 100 may perform an operation of acquiring eleventh log data corresponding to the eleventh period information from the raw database (1820). The eleventh log data may be included in the test database output by the test data acquirer 350.

The server 100 may perform an operation of acquiring a twentieth distribution of users on a first axis, which represents a period of time from a user's sign-up date to a time when first content is available, on the basis of the eleventh log data (1830).

The first content may be one of pieces of story content. A user may sequentially enjoy a plurality of pieces of content included in story content. In other words, a user has to finish content which precedes the first content to enjoy the first content. The server 100 may acquire a time taken by a user to use the first content from the user's sign-up date on the basis of the eleventh log data.

Also, the server 100 may perform an operation of acquiring a twentieth reference value included in reference data on the basis of the twentieth distribution (1840). Referring to FIGS. 6 and 7, the horizontal axis 610 may denote a period of time from a user's sign-up date to a time when the first content is available on the basis of log data of the user. The horizontal axis 610 may correspond to the first axis. The vertical axis 620 may denote the number of users corresponding to the period of time from the user's sign-up date to the time when the first content is available. The server 100 may acquire the twentieth distribution on the basis of the eleventh log data. The twentieth distribution may be shown as the graph 630. The server 100 may determine the twentieth reference value on the basis of the twentieth distribution. The twentieth reference value may be a value for determining whether a period of time from a user's sign-up date to a time when the first content is available is long or short. A process of determining a reference value on the basis of distribution has already been described with reference to FIGS. 6 and 7, and thus the description thereof is not reiterated.

Referring back to FIG. 18, the server 100 may perform an operation of acquiring a twenty-first distribution of users on a second axis, which represents a period of time from a user's sign-up date to a time when second content is available, on the basis of the eleventh log data (1850).

The second content may be one of pieces of story content. The second content may be enjoyed after the first content. The server 100 may acquire a time taken by a user to use the second content from the user's sign-up date on the basis of the eleventh log data.

Also, the server 100 may perform an operation of acquiring a twenty-first reference value included in reference data on the basis of the twenty-first distribution (1860). Referring to FIGS. 6 and 7, the horizontal axis 610 may denote a period of time from a user's sign-up date to a date when the second content is available on the basis of log data of a user. The horizontal axis 610 may correspond to the second axis. The vertical axis 620 may denote the number of users corresponding to the period of time from the sign-up date of the user and the date when the second content is available.

The server 100 may acquire the twenty-first distribution on the basis of the eleventh log data. The twenty-first distribution may be shown as the graph 630. The server 100 may determine the twenty-first reference value on the basis of the twenty-first distribution. The twenty-first reference value may be a value for determining whether a period of time from a user's sign-up date to a date when the second content is available is long or short. A process of determining a reference value on the basis of distribution has already been described with reference to FIGS. 6 and 7, and thus the description thereof is not reiterated.

The server 100 may perform the operation of acquiring psychological state information of a user to be analyzed using the twentieth reference value and the twenty-first reference value (240). For example, when a period of time from a sign-up date of the user to be analyzed to a date when the first content is available is smaller than the twentieth reference value and a period of time from the sign-up date of the user to be analyzed to a date when the second content is available is smaller than the twenty-first reference value, the server 100 may determine a psychological state of the user to be analyzed as being likely to be bored with the game service soon. The server 100 may output an analysis result. The user or the server 100 may take action according to the analysis result.

Figure 19:
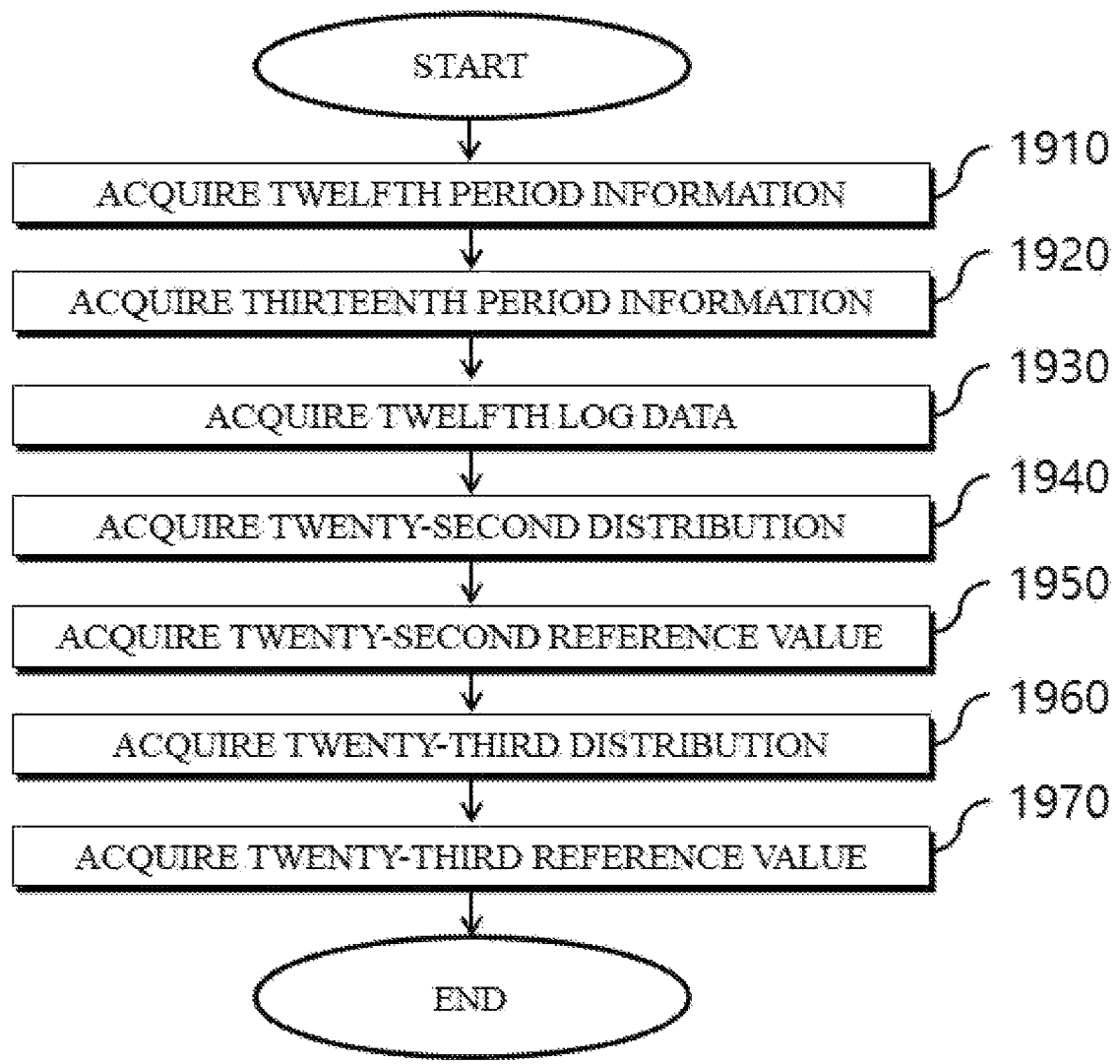
FIG. 19 is a flowchart illustrating a process of generating reference data of a thirteenth model according to an embodiment of the present disclosure.

FIG. 19 is a flowchart illustrating a process of generating reference data of a thirteenth model according to an embodiment of the present disclosure.

The thirteenth model is a psychological model for distinguishing a user who has a low character development rate and does not use items according to suitable tactics. When a user does not use items according to suitable tactics and has a low character development rate, the server 100 may determine a psychological state of the user as not being likely to have fun with the game service. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring twelfth period information from the setup information (1910). The twelfth period information may indicate a period of time in which log data required for applying the thirteenth model is collected. Referring to FIG. 4, the twelfth period information may correspond to the analysis period 440.

The server 100 may perform an operation of acquiring thirteenth period information from the setup information (1920). The thirteenth period information may be smaller than or equal to the twelfth period information.

The server 100 may perform the operation of generating reference data (230). The server 100 may perform an operation of acquiring twelfth log data corresponding to the twelfth period information from the raw database (1930). The twelfth log data may be included in the test database output by the test data acquirer 350.

The server 100 may perform an operation of acquiring a twenty-second distribution of users on a first axis, which represents the number of items included in a predetermined item list among a plurality of items used by a user during a thirteenth period from a user's sign-up date, on the basis of the twelfth log data (1940).

The server 100 may receive the predetermined item list from the memory. The predetermined item list indicates a list of items which enable a user to rapidly develop a character when using at least one of the items during the thirteenth period. The predetermined item list may include at least one piece of item identification information.

The predetermined item list may be input by a service provider. Also, the predetermined item list may be automatically acquired by the server 100. For example, the server 100 may select users who develop a character relatively rapidly on the basis of the raw database. The server 100 may acquire a list of items used by the selected users during the thirteenth period from the users' sign-up dates. The server 100 may determine identification information of the items commonly used by the selected users as the predetermined item list.

Also, the server 100 may perform an operation of acquiring a twenty-second reference value included in reference data on the basis of the twenty-second distribution (1950). Referring to FIGS. 6 and 7, the horizontal axis 610 may denote the number of items included in the predetermined item list among a plurality of items used by a user during the thirteenth period from the user's sign-up date on the basis of log data of the user. The horizontal axis 610 may correspond to the first axis. The vertical axis 620 may denote the number of users corresponding to the number of items included in the predetermined item list among the plurality of items used by the user during the thirteenth period from the user's sign-up date. The server 100 may acquire the twenty-second distribution on the basis of the twelfth log data. The twenty-second distribution may be shown as the graph 630. The server 100 may determine the twenty-second reference value on the basis of the twenty-second distribution. The twenty-second reference value may be a value for determining whether the number of items included in the predetermined item list among a plurality of items used by a user during the thirteenth period from the user's sign-up date is large or small. A process of determining a reference value on the basis of distribution has already been described with reference to FIGS. 6 and 7, and thus the description thereof is not reiterated.

Referring back to FIG. 19, the server 100 may perform an operation of acquiring a twenty-third distribution of users on a second axis, which represents information related to a character level variation per unit time, on the basis of the twelfth log data (1960).

The unit time may be one week, one day, one hour, or the like. The server 100 may acquire information related to character level variation per unit time on the basis of the twelfth log data.

Also, the server 100 may perform an operation of acquiring a twenty-third reference value included in reference data on the basis of the twenty-third distribution (1970). Referring to FIGS. 6 and 7, the horizontal axis 610 may denote information related to a character level variation per unit time on the basis of log data of a user. The horizontal axis 610 may correspond to the second axis. The vertical axis 620 may denote the number of users corresponding to the information related to a character level variation per unit time.

The server 100 may acquire the twenty-third distribution on the basis of the twelfth log data. The twenty-third distribution may be shown as the graph 630. The server 100 may determine the twenty-third reference value on the basis of the twenty-third distribution. The twenty-third reference value may be a value for determining whether information related to a character level variation per unit time is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the twenty-second reference value and the twenty-third reference value (240). For example, when the number of items included in the predetermined item list among a plurality of items used by the user to be analyzed during the thirteenth period from the user's sign-up date is smaller than the twenty-second reference value and a character level variation per unit time of the user to be analyzed is smaller than the twenty-third reference value, the server 100 may determine a psychological state of the user to be analyzed as being likely to be bored with the game service soon. The server 100 may output an analysis result. The user or the server 100 may take action according to the analysis result.

Figure 20:
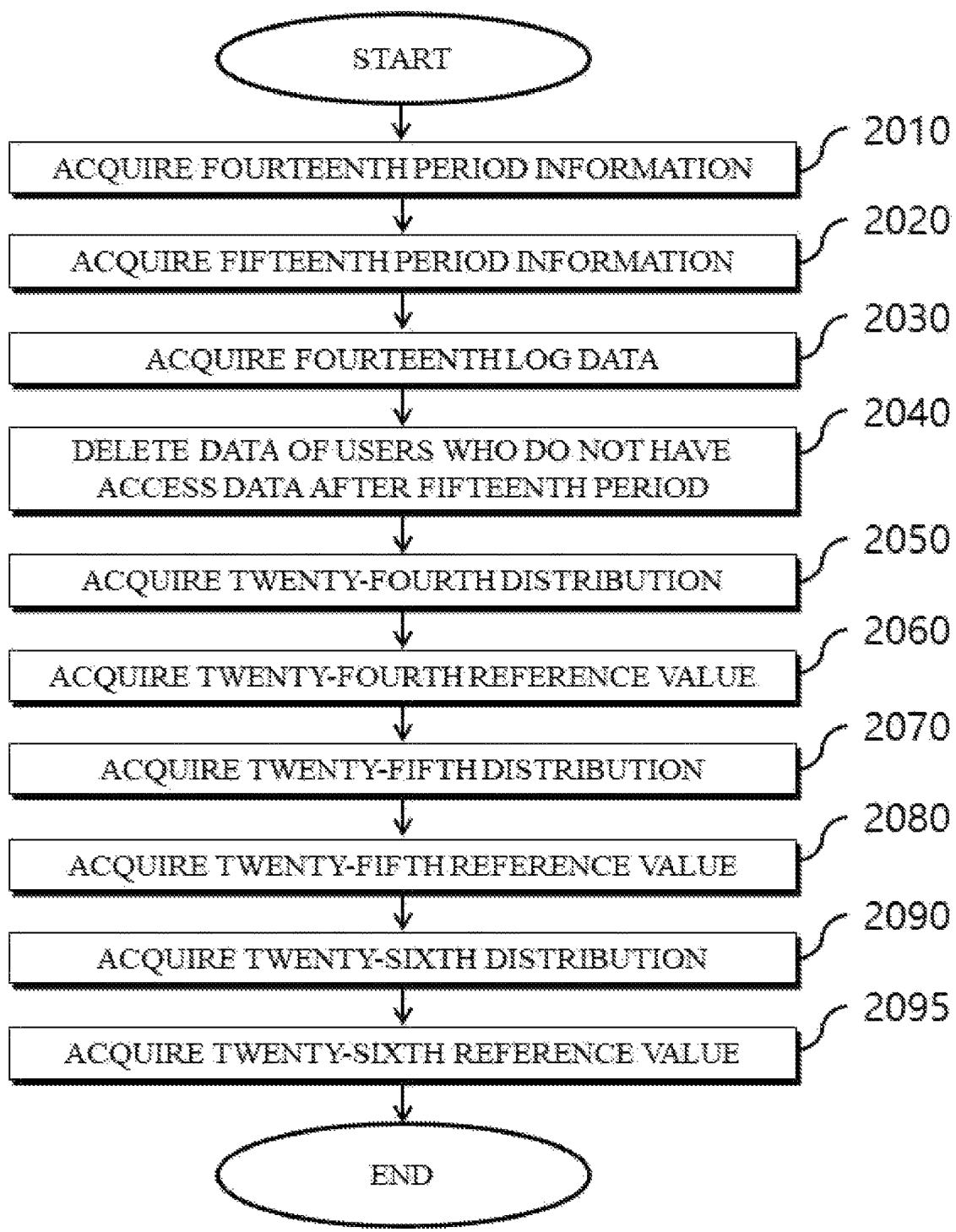
FIG. 20 is a flowchart illustrating a process of generating reference data of a fourteenth model according to an embodiment of the present disclosure.

FIG. 20 is a flowchart illustrating a process of generating reference data of a fourteenth model according to an embodiment of the present disclosure.

The fourteenth model is a psychological model for distinguishing a user who plays a game hard and efficiently but lacks time to play the game. When a user plays a game hard and efficiently but lacks time to play the game, the server 100 may determine a psychological state of the user as not being likely to have fun because the user cannot develop a character as much as he or she wants. The server 100 may select such a user and provide a game service suited to the user.

The server 100 may perform the operation of acquiring setup information (220). The server 100 may acquire setup information from the memory. Also, the server 100 may acquire setup information from an external device in a wired or wireless manner.

The server 100 may perform an operation of acquiring fourteenth period information from the setup information (2010). The fourteenth period information may indicate a period of time in which log data required for applying the fourteenth model is collected. Referring to FIG. 4, the fourteenth period information may correspond to the analysis period 440.

The server 100 may perform an operation of acquiring fifteenth period information from the setup information (2020). The fifteenth period information may be smaller than or equal to the fourteenth period information.

The server 100 may perform the operation of generating reference data (230). The server 100 may perform an operation of acquiring fourteenth log data corresponding to the fourteenth period information from the raw database (2030). The fourteenth log data may be included in the test database output by the test data acquirer 350.

The server 100 may perform an operation of deleting data of users, who do not have access information after a fifteenth period from sign-up dates of the users, from the fourteenth log data (2040). The server 100 may reduce the number of pieces of data to be analyzed by deleting data of users who do not have game service access information after the fifteenth period from the fourteenth log data. Also, users who have used the game service for a short period of time may be excluded from targets to be analyzed.

The server 100 may perform an operation of acquiring a twenty-fourth distribution of users on a first axis, which represents a user's online-money turnover rate, on the basis of the fourteenth log data (2050).

The server 100 may acquire a user's online money usage during a fourteenth period, online-money holdings at the start point of the fourteenth period, and online-money holdings at the end point of the fourteenth period from the fourteenth log data. Since the user may purchase online money or acquire online money by playing the game, the online-money usage during the fourteenth period may differ from the difference between the online-money holdings at the start point of the fourteenth period and the online-money holdings at the end point of the fourteenth period. Also, the server 100 may acquire an online-money turnover rate on the basis of the user's online money usage during the fourteenth period, online-money holdings at the start point of the fourteenth period, and online-money holdings at the end point of the fourteenth period. For example, the server 100 may acquire an online-money turnover rate on the basis of Equation 2.

Online-money turnover rate=(Online-money usage during fourteenth period)/{(Online-money holdings at start point of fourteenth period+Online-money holdings at end point of fourteenth period)/2}   Equation 2.

Also, the server 100 may perform an operation of acquiring a twenty-fourth reference value included in reference data on the basis of the twenty-fourth distribution (2060). Referring to FIGS. 6 and 7, the horizontal axis 610 may denote a user's online-money turnover rate on the basis of log data of the user. The horizontal axis 610 may correspond to the first axis. The vertical axis 620 may denote the number of users corresponding to the user's online-money turnover rate.

The server 100 may acquire the twenty-fourth distribution on the basis of the fourteenth log data. The twenty-fourth distribution may be shown as the graph 630. The server 100 may determine the twenty-fourth reference value on the basis of the twenty-fourth distribution. The twenty-fourth reference value may be a value for determining whether a user's online-money turnover rate is large or small. A process of determining a reference value on the basis of distribution has already been described with reference to FIGS. 6 and 7, and thus the description thereof is not reiterated.

The server 100 may perform an operation of acquiring a twenty-fifth distribution of users on a second axis, which represents a user's average daily play time, on the basis of the fourteenth log data (2070).

Also, the server 100 may perform an operation of acquiring a twenty-fifth reference value included in reference data on the basis of the twenty-fifth distribution (2080). Referring to FIGS. 6 and 7, the horizontal axis 610 may denote a user's average daily play time on the basis of log data of the user. The horizontal axis 610 may correspond to the second axis. The vertical axis 620 may denote the number of users corresponding to the user's average daily play time.

The server 100 may acquire the twenty-fifth distribution on the basis of the fourteenth log data. The twenty-fifth distribution may be shown as the graph 630. The server 100 may determine the twenty-fifth reference value on the basis of the twenty-fifth distribution. The twenty-fifth reference value may be a value for determining whether a user's average daily play time is long or short. A process of determining a reference value on the basis of distribution has already been described with reference to FIGS. 6 and 7, and thus the description thereof is not reiterated.

The server 100 may perform an operation of acquiring a twenty-sixth distribution of users on a third axis, which represents an experience point value acquired by a user per play time, on the basis of the fourteenth log data (2090).

Also, the server 100 may perform an operation of acquiring a twenty-sixth reference value included in reference data on the basis of the twenty-sixth distribution (2095). Referring to FIGS. 6 and 7, the horizontal axis 610 may denote an experience point value acquired by a user per play time on the basis of log data of the user. The horizontal axis 610 may correspond to the second axis. The vertical axis 620 may denote the number of users corresponding to the experience point value acquired by the user per play time.

The server 100 may acquire the twenty-sixth distribution on the basis of the fourteenth log data. The twenty-sixth distribution may be shown as the graph 630. The server 100 may determine the twenty-sixth reference value on the basis of the twenty-sixth distribution. The twenty-sixth reference value may be a value for determining whether an experience point value acquired by a user per play time is large or small. A process of determining a reference value on the basis of distribution has already been described with reference to FIGS. 6 and 7, and thus the description thereof is not reiterated.

The server 100 may perform the operation of acquiring psychological state information of a user to be analyzed using the twenty-fourth reference value, the twenty-fifth reference value, and the twenty-sixth reference value (240). For example, when information on an online-money turnover rate of a user to be analyzed is larger than the twenty-fourth reference value, an average daily play time of the user to be analyzed is smaller than the twenty-fifth reference value, and an experience point value acquired by the user to be analyzed per play time is larger than the twenty-sixth reference value, the server 100 may determine that the user to be analyzed rapidly develops a character in a short period of time but does not have enough time to enjoy the game. The server 100 may output an analysis result. The user or the server 100 may take action according to the analysis result.

The present disclosure has been particularly shown and described with reference to various embodiments. Those skilled in the art should understand that various changes in form and details may be made therein without departing from the essential characteristics of the present disclosure. Therefore, the embodiments described herein should be considered from an illustrative aspect rather than from a restrictive aspect. The scope of the present disclosure should be defined not by the detailed description but by the appended claims, and all differences falling within a scope equivalent to the claims should be construed as being encompassed by the present disclosure.

The embodiments can be written as computer programs and can be implemented in general-use digital computers that execute the programs using a computer-readable recording medium. Examples of the computer-readable recording medium may include storage media such as magnetic storage media (e.g., ROMs, floppy disks, hard disks, etc.), optical recording media (e.g., CD-ROMs, DVDs, etc.), etc.

What is claimed is:

1. An operating method of a server which analyzes a user's psychology with a plurality of models to classify the user, the method comprising:
   receiving a raw database from a server of a game service provider;
   acquiring setup information of at least one module to acquire reference data corresponding to one of the plurality of models from the raw database;
   generating reference data from data of users included in the raw database on the basis of at least one module which is set on the basis of the setup information; and
   acquiring psychological state information of the user to be analyzed on the basis of the reference data,
   wherein the acquiring of the setup information comprises:
   acquiring first period information from the setup information; and
   acquiring a minimum number of times a Player Versus Player (PvP) mode is played from the setup information, and
   wherein the generating of the reference data comprises:
   acquiring first log data, which corresponds to the first period information, of users who have used the PvP mode the minimum number of times the PvP mode is played or more from the raw database;
   acquiring a first distribution of users on a first axis, which represents a PvP content play ratio, on the basis of the first log data;
   acquiring a first reference value included in the reference data on the basis of the first distribution;

acquiring a second distribution of users on a second axis, which represents a win rate in the PvP mode, on the basis of the first log data; and acquiring a second reference value included in the reference data on the basis of the second distribution.

2. An operating method of a server which analyzes a user's psychology with a plurality of models to classify the user, the method comprising:

receiving a raw database from a server of a game service provider;

acquiring setup information of at least one module to acquire reference data corresponding to one of the plurality of models from the raw database;

generating reference data from data of users included in the raw database on the basis of at least one module which is set on the basis of the setup information; and acquiring psychological state information of the user to be analyzed on the basis of the reference data, wherein the acquiring of the setup information comprises:

acquiring second period information from the setup information, wherein the generating of the reference data comprises:

acquiring second log data corresponding to the second period information from the raw database;

acquiring a third distribution of users on a first axis, which represents the number of characters owned by a user, on the basis of the second log data;

acquiring a third reference value included in the reference data on the basis of the third distribution;

acquiring a fourth distribution of users on a second axis, which represents information related to a ratio of an amount of online money used for an item that changes an appearance of a character, on the basis of the second log data; and acquiring a fourth reference value included in the reference data on the basis of the fourth distribution.

3. An operating method of a server which analyzes a user's psychology with a plurality of models to classify the user, the method comprising:

receiving a raw database from a server of a game service provider;

acquiring setup information of at least one module to acquire reference data corresponding to one of the plurality of models from the raw database;

generating reference data from data of users included in the raw database on the basis of at least one module which is set on the basis of the setup information; and acquiring psychological state information of the user to be analyzed on the basis of the reference data, wherein the acquiring of the setup information comprises:

acquiring fourth period information from the setup information, wherein the generating of the reference data comprises:

acquiring fourth log data corresponding to the fourth period information from the raw database;

acquiring a sixth distribution of users on a first axis, which represents a time in which a user uses first content, on the basis of the fourth log data;

acquiring a sixth reference value included in the reference data on the basis of the sixth distribution;

acquiring a seventh distribution of users on a second axis, which represents a time in which a user uses second content, on the basis of the fourth log data; and acquiring a seventh reference value included in the reference data on the basis of the seventh distribution.

4. An operating method of a server which analyzes a user's psychology with a plurality of models to classify the user, the method comprising:

receiving a raw database from a server of a game service provider;

acquiring setup information of at least one module to acquire reference data corresponding to one of the plurality of models from the raw database;

generating reference data from data of users included in the raw database on the basis of at least one module which is set on the basis of the setup information; and acquiring psychological state information of the user to be analyzed on the basis of the reference data, wherein the acquiring of the setup information comprises:

acquiring sixth period information from the setup information, wherein the generating of the reference data comprises:

acquiring sixth log data corresponding to the sixth period information from the raw database;

acquiring a tenth distribution of users on a first axis, which represents efficiency information acquired on the basis of a total play time and character level information, on the basis of the sixth log data;

acquiring a tenth reference value included in the reference data on the basis of the tenth distribution;

acquiring an eleventh distribution of users on a second axis, which represents a billed amount for a user, on the basis of the sixth log data; and acquiring an eleventh reference value included in the reference data on the basis of the eleventh distribution.

5. An operating method of a server which analyzes a user's psychology with a plurality of models to classify the user, the method comprising:

receiving a raw database from a server of a game service provider;

acquiring setup information of at least one module to acquire reference data corresponding to one of the plurality of models from the raw database;

generating reference data from data of users included in the raw database on the basis of at least one module which is set on the basis of the setup information; and acquiring psychological state information of the user to be analyzed on the basis of the reference data, wherein the acquiring of the setup information comprises:

acquiring eighth period information from the setup information, wherein the generating of the reference data comprises:

acquiring eighth log data corresponding to the eighth period information from the raw database;

acquiring a fourteenth distribution of users on a first axis, which represents the number of types of characters used by a user, on the basis of the eighth log data;

acquiring a fourteenth reference value included in the reference data on the basis of the fourteenth distribution;

acquiring a fifteenth distribution of users on a second axis, which represents the number of types of character development items acquired by the user, on the basis of the eighth log data; and acquiring a fifteenth reference value included in the reference data on the basis of the fifteenth distribution.

6. An operating method of a server which analyzes a user's psychology with a plurality of models to classify the user, the method comprising:

receiving a raw database from a server of a game service provider;

acquiring setup information of at least one module to acquire reference data corresponding to one of the plurality of models from the raw database;
generating reference data from data of users included in the raw database on the basis of at least one module which is set on the basis of the setup information; and
acquiring psychological state information of the user to be analyzed on the basis of the reference data,
wherein the acquiring of the setup information comprises:
acquiring ninth period information from the setup information,
wherein the generating of the reference data comprises:
acquiring ninth log data corresponding to the ninth period information from the raw database;
acquiring a sixteenth distribution of users on a first axis, which represents variability in specific-time-slot play ratios during a third sub-period included in the ninth period, on the basis of the ninth log data;
acquiring a sixteenth reference value included in the reference data on the basis of the sixteenth distribution;
acquiring a seventeenth distribution of users on a second axis, which represents variability in specific-time-slot play ratios during a fourth sub-period included in the ninth period after the third sub-period, on the basis of the ninth log data; and
acquiring a seventeenth reference value included in the reference data on the basis of the seventeenth distribution.

7. An operating method of a server which analyzes a user's psychology with a plurality of models to classify the user, the method comprising:
receiving a raw database from a server of a game service provider;
acquiring setup information of at least one module to acquire reference data corresponding to one of the plurality of models from the raw database;
generating reference data from data of users included in the raw database on the basis of at least one module which is set on the basis of the setup information; and
acquiring psychological state information of the user to be analyzed on the basis of the reference data,
wherein the acquiring of the setup information comprises:
acquiring sixteenth period information from the setup information,
wherein the generating of the reference data comprises:
acquiring fifteenth log data corresponding to the sixteenth period information from the raw database;
acquiring a twenty-seventh distribution of users on a first axis, which represents information related to a play time during a predetermined period of time, on the basis of the fifteenth log data;
acquiring a twenty-seventh reference value included in the reference data on the basis of the twenty-seventh distribution;
acquiring a twenty-eighth distribution of users on a second axis, which represents information related to a period of time between a sign-up date and a date when an item that enhances character performance is changed, on the basis of the fifteenth log data; and
acquiring a twenty-eighth reference value included in the reference data on the basis of the twenty-eighth distribution.

8. An operating method of a server which analyzes a user's psychology with a plurality of models to classify the user, the method comprising:
receiving a raw database from a server of a game service provider;
acquiring setup information of at least one module to acquire reference data corresponding to one of the plurality of models from the raw database;
generating reference data from data of users included in the raw database on the basis of at least one module which is set on the basis of the setup information; and
acquiring psychological state information of the user to be analyzed on the basis of the reference data,
wherein the acquiring of the setup information comprises:
acquiring twelfth period information from the setup information; and
acquiring thirteenth period information from the setup information,
wherein the generating of the reference data comprises:
acquiring twelfth log data corresponding to the twelfth period information from the raw database;
acquiring a twenty-second distribution of users on a first axis, which represents the number of items included in a predetermined item list among a plurality of items used by a user for a thirteenth period from a sign-up date of the user, on the basis of the twelfth log data;
acquiring a twenty-second reference value included in the reference data on the basis of the twenty-second distribution;
acquiring a twenty-third distribution of users on a second axis, which represents information related to a character level variation per unit time, on the basis of the twelfth log data; and
acquiring a twenty-third reference value included in the reference data on the basis of the twenty-third distribution.

9. An operating method of a server which analyzes a user's psychology with a plurality of models to classify the user, the method comprising:
receiving a raw database from a server of a game service provider;
acquiring setup information of at least one module to acquire reference data corresponding to one of the plurality of models from the raw database;
generating reference data from data of users included in the raw database on the basis of at least one module which is set on the basis of the setup information; and
acquiring psychological state information of the user to be analyzed on the basis of the reference data,
wherein the acquiring of the setup information comprises:
acquiring fourteenth period information from the setup information; and
acquiring fifteenth period information from the setup information,
wherein the generating of the reference data comprises:
acquiring fourteenth log data corresponding to the fourteenth period information from the raw database;
deleting data of users who do not have access information after a fifteenth period from sign-up dates of the users from the fourteenth log data;
acquiring a twenty-fourth distribution of users on a first axis, which represents information on the user's online-money turnover rate, on the basis of the fourteenth log data;
acquiring a twenty-fourth reference value included in the reference data on the basis of the twenty-fourth distribution;
acquiring a twenty-fifth distribution of users on a second axis, which represents the user's average daily play time, on the basis of the fourteenth log data;

acquiring a twenty-fifth reference value included in the reference data on the basis of the twenty-fifth distribution;

acquiring a twenty-sixth distribution of users on a third axis, which represents an experience point value acquired by the user per play time, on the basis of the fourteenth log data; and acquiring a twenty-sixth reference value included in the reference data on the basis of the twenty-sixth distribution.

* * * * *